(12) United States Patent
Kaneko et al.

(10) Patent No.: US 7,892,316 B2
(45) Date of Patent: Feb. 22, 2011

(54) FINE COMPOSITE METAL PARTICLES AND THEIR PRODUCTION METHOD, MICRO-BODIES, AND MAGNETIC BEADS

(75) Inventors: Yasushi Kaneko, Kumagaya (JP); Shigeo Fujii, Kumagaya (JP); Hisato Tokoro, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 862 days.

(21) Appl. No.: 11/681,059

(22) Filed: Mar. 1, 2007

(65) Prior Publication Data

US 2007/0144307 A1      Jun. 28, 2007

Related U.S. Application Data

(62) Division of application No. 10/934,515, filed on Sep. 7, 2004, now Pat. No. 7,285,329.

(30) Foreign Application Priority Data

| Feb. 18, 2004 | (JP) | ............................. 2004-041659 |
| Feb. 24, 2004 | (JP) | ............................. 2004-048480 |
| Feb. 27, 2004 | (JP) | ............................. 2004-053554 |

(51) Int. Cl.
    *B22F 9/20* (2006.01)
(52) U.S. Cl. ......................................... 75/348; 75/369
(58) Field of Classification Search .................. None
    See application file for complete search history.

(56) References Cited

U.S. PATENT DOCUMENTS

| 5,028,278 A | * | 7/1991 | Kadono et al. .............. 148/105 |
| 5,071,724 A | * | 12/1991 | Goldman .................. 430/106.1 |
| 5,225,281 A | * | 7/1993 | Tamai et al. ................. 428/403 |
| 5,985,466 A | * | 11/1999 | Atarashi et al. ............. 428/570 |
| 6,838,166 B2 | | 1/2005 | Phillips et al. |
| 2003/0027018 A1 | | 2/2003 | Hayashi et al. |

FOREIGN PATENT DOCUMENTS

| EP | 0 675 511 A1 | 10/1995 |
| EP | 0 762 441 A1 | 3/1997 |
| EP | 0 949 027 A1 | 10/1999 |
| JP | 63-001003 A | 1/1988 |
| JP | 09-142502 | 6/1997 |
| JP | 11-269503 A | 10/1999 |
| JP | 2000/030920 | 1/2000 |
| JP | 2000-030920 | 1/2000 |
| JP | 2000-256388 | 9/2000 |
| JP | 2001-039707 | 2/2001 |

(Continued)

OTHER PUBLICATIONS

Intermag 2003; Program of the 2003 IEEE International Magnetics Conference; Mar. 30-Apr. 2, 2003; Boston, Massachusetts, USA.

(Continued)

*Primary Examiner*—George Wyszomierski
(74) *Attorney, Agent, or Firm*—Sughrue Mion, PLLC

(57) ABSTRACT

Fine composite metal particle comprising a metal core and a coating layer of carbon, and being obtained by reducing metal oxide powder with carbon powder.

6 Claims, 28 Drawing Sheets

FOREIGN PATENT DOCUMENTS

| | | |
|---|---|---|
| JP | 2001-078761 | 3/2001 |
| JP | 2002-507055 A | 3/2002 |
| JP | 2002-353016 A | 6/2002 |
| JP | 2004-124248 | 4/2004 |
| JP | 2004/124248 | 4/2004 |
| JP | 2004/253697 | 9/2004 |
| JP | 2004/259807 | 9/2004 |
| WO | WO 99/46782 | 9/1999 |
| WO | 02/075309 A1 | 2/2002 |
| WO | 03/015109 A1 | 2/2003 |

OTHER PUBLICATIONS

Hisato Tokoro, et al; Iron Nanoparticles Coated With Boron Nitride Nanolayers synthesized by a Solid Phase Reaction; IEEE Transactions on Magnetics, vol. 39, No. 5, Sep. 2003; pp. 2761-2763.

14$^{th}$ European Conference on Diamond, Diamond-Like Materials, Carbon Nanotubes, Nitrides & Silicon Carbide; Sep. 7-12, 2003; Salzburg Congress Centre, Salzburg, Austria; Abstract Boot; Abstract5.3.11 and 5.7.11 (two references).

Hisato Tokoro, et al; Microstructures and magnetic properties of boron nitride- and carbon-coated iron nanoparticles synthesized by a solid phase reaction; J. Mater. Chem., 2004, 14, 253-257; first published Nov. 20, 2003.

Takeo Oku, et al.; Formation, atomic structures and properties of boron nitride and carbon nanocage fullerene materials; International Journal of Inorganic Materials 3 (2001) 597-612; accepted Aug. 13, 2001.

* cited by examiner

FINE COMPOSITE METAL PARTICLES AND THEIR PRODUCTION METHOD, MICRO-BODIES, AND MAGNETIC BEADS This application is a divisional of application Ser. No. 10/934,515, filed Sep. 7, 2004, now U.S. Pat. No. 7,285,329.

FIELD OF THE INVENTION

The present invention relates to fine composite metal particles and their production method, which may be used, for instance, for magnetic recording media such as magnetic tapes, magnetic recording disks, etc., electronic devices such as noise-suppressing sheets, inductors, yokes, etc., magnetic beads for extracting and separating DNA, protein components, cells, etc.

BACKGROUND OF THE INVENTION

As electronic devices has become smaller and lighter in weight with higher performance, materials for the electronic devices are required to have higher properties. One of methods for achieving such object is to make the materials as small as a nano-size level. In magnetic products formed by compacting magnetic powder, the use of fine magnetic powder is expected to improve soft or hard magnetic properties.

In magnetic recording tapes having hard magnetic particles coated on substrates, for instance, both the reduction of a magnetic particle size and the improvement of magnetic properties are required to increase their recording density. The magnetic particles have conventionally been ferrite powder, which suffers from low signal intensity because of small magnetization. To obtain sufficient output, magnetic metal particles of Fe and/or Co are suitable. However, when the particle size of metal particles is made smaller than 1 μm or less for higher recording density, the oxidation reaction of metal particles vigorously occurs in the air because they are vulnerable to oxidation, resulting in the deterioration of magnetization.

To improve the oxidation resistance of fine metal particles containing Fe and/or Co, proposals were made to coat the fine magnetic metal particles with ferrite layers (for instance, JP 2000-30920 A), or to coat Fe powder with graphite (for instance, JP 9-143502 A). However, the metal oxide coating disclosed in JP 2000-30920 A is disadvantageous in considerably oxidizing the metal particles, The coating of metal particles with graphite as disclosed in JP 9-143502 A needs a heat treatment at as high a temperature as 1600° C. to 2800° C. to melt carbon, disadvantageous for industrial use.

When magnetic metal powder is used in the form of moldings particularly in high-frequency applications, electrical insulation should be secured between magnetic metal particles to improve properties. For this purpose, each metal particle should be coated with a high-resistance material.

Proposed as a method for solving these problems is to coat metal particles with high-resistance boron nitride (BN) (see International Journal of Inorganic Materials 3 2001, p. 597, 2001). BN is a material usable for crucibles, having a melting point of 3000° C. excellent in high-temperature stability, low reactivity to metals and good insulation. The coating of metal particles with BN can be carried out by (1) heating a mixed powder of a metal and B by arc discharge in a nitrogen atmosphere, (2) heating a mixed powder of a metal and B in a mixed atmosphere of hydrogen and ammonia, or (3) heat-treating a mixture of a metal nitrate, urea and boric acid in a hydrogen atmosphere.

However, the above methods (1)-(3) suffer from the following disadvantages. Specifically, the above methods (1) and (2) suffer from the risk of burning due to rapid oxidation when handling ultrafine metal particles of 1 μm or less. The method (1) suffers from low productivity because of arc discharge, and is disadvantageous for industrial use because of high reaction temperatures near 2000° C. The production method (3) is likely to generate a harmful gas ($NO_x$) because of the thermal decomposition of metal nitrates. In addition, the hydrogen gas used in the methods (2) and (3) is easily exploded, unsuitable for industrial use. These methods (2) and (3) suffer from extremely low productivity.

In addition, conventional coated metal particles have deteriorated saturation magnetization because part of metal particles are modified with coating materials. Thus, it is difficult to use fine particles produced by the conventional technologies for biochemical applications such as the extraction of DNA and proteins, magnetic recording media, etc.

Recently, fine magnetic particles have become used in medical diagnosis and biological examination. For instance, the use of superparamagnetic metal oxide particles as carriers for binding nucleic acids is proposed (JP 2001-78761 A). The superparamagnetic metal oxide exhibits magnetization only when an external magnetic field is applied. Because magnetic particles are exposed to acidic or alkaline solutions in the above applications, their surfaces should be chemically stable. In addition, antibodies for binding target substances should be easily attached to their surfaces. When magnetic powder is used as carriers for extracting nucleic acids, the metal or metal oxide powder is coated with silicon oxide (JP 2000-256388 A). According to this method, only coatings or fine particles of silicon oxide are used to cover the metal or metal oxide powder Silicon oxide is formed by the hydrolysis of silicon alkoxides or by using condensed sodium silicate.

The magnetic particles for magnetic beads should have as small a particle size as predominantly 1 to 10 nm to exhibit superparamagnetism. Accordingly, an extremely small force is induced in magnetic particles by an external magnetic field, failing to gather the particles efficiently. Because of a weak attraction force by a magnetic field, once gathered magnetic particles are likely to flow out together with a discharged solution. In the step of extracting nucleic acids with magnetic powder having a silicon oxide coating or fine silicon oxide particles on a magnetic metal core, the metal is likely to be dissolved in a solvent or oxidized, resulting in the deterioration of magnetic properties. The metal dissolved in a solvent forms a complex with a buffer solution, hindering the extraction of DNA. When the core is made of a metal oxide, the magnetic powder has extremely lower magnetic properties than when the core is made of a magnetic metal, resulting in lower efficiency in the extraction of nucleic acids.

OBJECT OF THE INVENTION

Accordingly, an object of the present invention is to provide fine composite metal particles with high saturation magnetization and chemical stability and excellent in other properties, and a method for producing such fine composite metal particles.

SUMMARY OF THE INVENTION

The fine composite metal particles according to one embodiment of the present invention have an average particle size of 1 μm or less, each fine composite metal particle comprising a metal core and a carbon coating layer, and being obtained by reducing metal oxide powder with carbon powder.

Each of the fine composite metal particles according to another embodiment of the present invention comprises a metal core, a carbon layer covering the metal core, and wire-shaped or tubular carbon micro-bodies, which are formed by reducing metal oxide powder in a non-oxidizing atmosphere.

The fine composite metal particles according to a further embodiment of the present invention have an average particle size of 1 µM or less, each fine composite metal particle comprising (a) an iron-based metal core comprising 1% or more and less than 50% by mass of at least one element selected from the group consisting of Al, As, Be, Cr, Ga, Ge, Mo, P, Sb, Si, Sn, Ti, V, W and Zn, and having a main structural phase of α-Fe, and (b) a coating layer mainly composed of carbon and/or boron nitride, the fine composite metal particles being obtained by reducing iron oxide powder.

Each of the nano-sized, spherical, composite metal particles according to a still further embodiment of the present invention comprises an iron-based metal core comprising Co and/or Ni, and a coating layer having a thickness of 1 to 40 nm, the mass ratios of Co/Fe and Ni/Fe being 0.3 to 0.82, and 0.01 to 0.5, respectively.

Each of the nano-sized, spherical, composite metal particles according to a still further embodiment of the present invention comprises an iron-based metal core comprising Co and/or Ni, and a coating layer having a thickness of 1 to 40 nm, a ratio of the intensity I (111) of a (111) peak of γ-Fe having a face-centered cubic crystal structure to the intensity I (110) of a (110) peak of α-Fe having a body-centered cubic crystal structure is 0.2 or less in an X-ray diffraction pattern.

Each of the fine composite metal particles according to a still further embodiment of the present invention comprises a metal core comprising a magnetic metal as a main component and having an average particle size of :10 µm or less, and a multilayer coating of 2 or more different inorganic materials.

In the above fine composite metal particles, carbon on a surface of each metal core is preferably composed mainly of graphite with 2 or more crystal lattice planes. Carbon on a surface of each metal core preferably has a thickness of 100 nm or less.

The metal core is preferably composed mainly of a magnetic metal; and the saturation magnetization of the fine composite metal particles is preferably 10% or more of that of the magnetic metal.

Increase in an oxygen content (% by mass) by a heat treatment at a humidity of 100%, a temperature of 120° C. and 1 atm for 24 hours is preferably 50% or less relative to before the heat treatment.

A ratio of the intensity I (111 ) of a (111) peak of γ-Fe having a face-centered cubic crystal structure to the intensity I (110) of a (110) peak of α-Fe having a body-centered cubic crystal structure is preferably 0.3 or less in an X-ray diffraction pattern.

An innermost inorganic layer partially or entirely covering the metal core is preferably mainly formed by carbon and/or boron nitride. The inorganic material preferably has 2 or more crystal lattice planes. The innermost inorganic layer preferably has a thickness of 100 nm or less.

The innermost inorganic layer preferably comprises at least one element selected from the group consisting of Si, V, Ti, Al, Nb, Zr and Cr.

The inorganic layer outside the innermost inorganic layer is preferably substantially composed of silicon oxide or gold. The silicon oxide layer preferably has a thickness of 400 nm or less. The outside inorganic layer is preferably coated with a resin. The resin is preferably coated with a silicon oxide layer. The resin layer is preferably sandwiched by the innermost inorganic layer and the outside inorganic layer. The outside inorganic layer preferably has at least one functional group selected from the group consisting of —NH$_2$, —OH and —COOH on its surface.

The method for producing fine composite metal particles coated with carbon according to a still further embodiment of the present invention comprises heat-treating a mixture of metal oxide powder and carbon powder in a non-oxidizing atmosphere.

The method for producing fine composite metal particles each comprising a metal core, a carbon layer covering the metal core, and wire-shaped or tubular carbon micro-bodies according to a still further embodiment of the present invention comprises heat-treating a mixture of metal oxide powder and carbon powder in a non-oxidizing atmosphere to reduce the metal oxide, The method for producing fine composite metal particles according to a still further embodiment of the present invention comprises the steps of mixing oxide powder of a magnetic metal with at least one of boron-containing powder and carbon powder to provide a mixed powder, heat-treating the mixed powder in a non-oxidizing atmosphere to produce fine metal particles each coated with a layer based on carbon and/or boron nitride, and further coating the resultant coated fine metal particles with an inorganic material.

The method for producing fine composite metal particles according to a still further embodiment of the present invention comprises the steps of mixing oxide powder of a magnetic metal with powder containing at least one element selected from the group consisting of Si, V, Ti, Al, Nb, Zr and Cr to provide a mixed powder, heat-treating the mixed powder in a non-oxidizing atmosphere to produce fine metal particles coated with a layer based on at least one of the elements, and further coating the resultant coated fine metal particles with an inorganic material.

The method for producing fine composite metal particles according to a still further embodiment of the present invention comprises the steps of mixing oxide powder of a magnetic metal, at least one of boron-containing powder and carbon powder, and powder containing at least one element selected from the group consisting of Al, As, Be, Cr, Ga, Ge, Mo, P, Sb, Si, Sn, Ti, V, W and Zn to provide a mixed powder; heat-treating the mixed powder in a non-oxidizing atmosphere to produce fine metal particles containing at least one of the above elements and coated with a layer comprising carbon and/or boron nitride, and further coating the resultant coated fine metal particles with an inorganic material.

In the production method of fine composite metal particles, the heat treatment is conducted at a temperature of 600 to 1600° C. The layer of the inorganic material is preferably substantially composed of silicon oxide formed by hydrolyzing silicon alkoxide. The silicon oxide layer is preferably formed from silicon alkoxide, water, a catalyst and an electrolyte in an alcohol solvent. After forming the inorganic layer, the fine composite metal particles are preferably further coated with an amino-group-containing silane coupling agent to introduce an —NH$_2$ group.

The wire-shaped or tubular micro-bodies of graphite-phase carbon according to a still further embodiment of the present invention are formed by reducing metal oxide powder in a non-oxidizing atmosphere.

The magnetic beads for extracting biosubstances according to a still further embodiment of the present invention comprise the above fine composite metal particles.

DETAILED DESCRIPTION OF THE PREFERRED EMBODIMENTS

Figure 1:
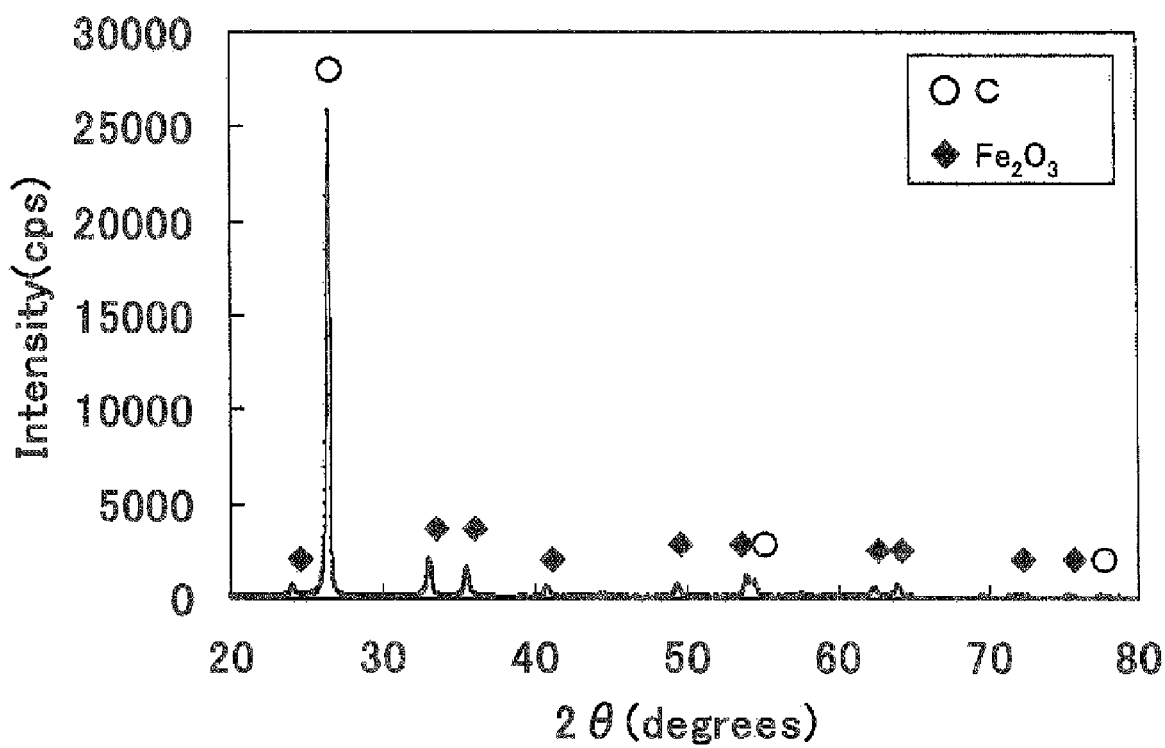
FIG. 1 is a graph showing the X-ray diffraction pattern of the mixed powder before the heat treatment.

Each fine composite metal particle of the present invention comprises a metal core and a coating layer, having an average particle size of 10 µm or less. The coating layer comprises 2 or more different inorganic materials. The above particle size range is necessary for good soft magnetic properties. When the average particle size exceeds 10 µm, the fine composite metal particles have low dispersibility in a solvent, resulting in precipitation in a short period of time. The average particle size of the fine composite metal particles is desirably in a range of 0.1 to 5 µm to have extremely high dispersibility in a solvent. Though not particularly restrictive, the lower limit of the average particle size is preferably 10 nm, so that Fe, Co and Ni particles may have critical sizes for superparamagnetism.

[1] Metal Core

The metal core is preferably composed of at least one magnetic transition metal selected from the group consisting of Fe, Co and Ni. It may be formed by Fe, Co or Ni alone or their alloys such as Fe—Co alloys or Fe—Ni alloys, or alloys of Fe, Co and/or Ni containing other transition metals such as Cr, Ti, Nb, Si, Zr, etc.

Particularly in the case of iron-based alloys, elements X added to Fe are preferably those providing a stable α phase even at as high temperatures as 1000° C. or higher when alloyed with Fe. The iron-based alloy preferably comprises at least one element X selected from the group consisting of Al, As, Be, Cr, Ga, Ge, Mo, P, Sb, Si, Sn, Ti, V, W and Zn. Because finer metal Fe particles precipitate a paramagnetic γ phase having a face-centered cubic crystal structure, resulting in decreased magnetic properties, the element X is preferably 1 to 50% by mass in the fine composite metal particles having an average particle size of 1 µm or less to suppress the γ phase. The fine composite metal particles containing such element may be obtained by heat-treating a mixture of at least one of boron-containing powder and carbon powder, oxide powder of a magnetic metal, and powder containing at least one element selected from the group consisting of Al, As, Be, Cr, Ga, Ge, Mo, P, Sb, Si, Sn, Ti, V, W and Zn in a non-oxidizing atmosphere. The addition of the element X forms fine α-Fe phase particles, resulting in an intensity ratio I (111)/I (110) of 0.3 or less in an X-ray diffraction pattern, wherein I (111) is the intensity of a (111) diffraction peak of γ-Fe having a face-centered cubic crystal structure, and I (110) is the intensity of a (110) diffraction peak of α-Fe having a body-centered cubic rystal structure. Thus, even the fine composite metal particles having an average particle size of 1 µm or less, further 100 nm or less, have high saturation magnetization. In the fine composite metal particle comprising a metal core having a multilayer coating of inorganic materials according to the present invention, a small metal core contributes to high saturation magnetization.

The fine metal particles may have Fe as a main component, and contain Co and/or Ni. The average particle size of the fine composite metal particles is particularly preferably in a range of 1 to 10000 nm. In this case, the thickness of the coating layer is preferably in a range of 1 to 40 nm to have high saturation magnetization. The amounts of Co and Ni are preferably such that mass ratios of Co/Fe and Ni/Fe are 0.3-0.82 and 0.01-0.5, respectively, in the nano-sized, iron-based particles. In this binary composition, the alloying of Fe with Co elevates the transition temperature of an α phase to a γ phase, a higher temperature phase, thereby stabilizing the α phase and suppressing the precipitation of the γ-Fe phase. When the mass ratio of Co to Fe is less than 0.3, no addition effect of Co is expected. On the other hand, when Co/Fe exceeds 0.82, the saturation magnetization becomes less than 120 Am$^2$/kg. The addition of Co in the above preferred range suppresses the precipitation of the γ phase, resulting in a ratio I (111)/I (110) of 0.2 or less and thus high saturation magnetization, wherein I (111) is the intensity of a (111) diffraction peak of a face-centered cubic crystal structure (corresponding to the γ phase), and I (110) is the intensity of a (110) diffraction peak of a body-centered cubic crystal structure (corresponding to the a phase) in an X-ray diffraction pattern.

The ternary Fe—Co—Ni composition has, in addition to the above effects, excellent corrosion resistance and soft magnetic properties, high saturation magnetization, and low magnetostriction. When the ratio of NiFe is less than 0.01 by mass, the fine metal particles have large magnetostriction. On the other hand, when the ratio of NiFe is more than 0.5 by mass, the fine metal particles have saturation magnetization of less than 100 Am$^2$/kg.

Because the Fe-based core containing Co and/or Ni has high saturation magnetization, the metal core preferably has a multilayer coating of inorganic materials, so that the whole coated particles have high saturation magnetization. The metal core with suppressed γ-Fe, on which a multilayer coating of 2 or more different inorganic materials is formed, is preferably as small as 1 μm or less in an average particle size.

[2] Innermost Inorganic Coating

In the multilayer coating of 2 or more inorganic materials formed on the metal core, an inorganic layer (innermost layer) in direct contact with the metal core for partial or entire covering is preferably substantially composed of carbon and/or boron nitride. Because carbon and boron nitride have excellent lubrication, the coating of the metal core with carbon and/or boron nitride improves the dispersibility of metal particles. It should be noted that carbon as a simple substance is categorized in the inorganic materials. Carbon has a 6-membered ring structure peculiar to graphite, which is laminated in a laminar manner. Boron nitride also has a ring structure, which is laminated in a laminar manner. These inorganic materials preferably cover the entire surface of the metal core uniformly, though they may partially cover the metal core as long as oxidation can be prevented when exposed to the air.

The ring plane of the inorganic material in the inorganic layer covers the metal core in a laminar manner. This is easily achieved by carbon having a graphite structure. In the case of boron nitride, it has a hexagonal crystal structure to achieve the above object. The inorganic layer with such a laminar structure preferably has excellent chemical stability, because of few branches such as dangling bonds, etc.

The innermost layer of carbon and/or boron nitride in contact with the metal core preferably has a thickness of 100 nm or less. When it has a thickness exceeding 100 nm, the saturation magnetization decreases because of an increased non-magnetic phase. The thickness of the innermost layer is more preferably 50 nm or less, most preferably 40 nm or less.

The innermost inorganic layer preferably has 2 or more crystal lattice planes laminated in a laminar manner to have excellent corrosion resistance. In the case of a single crystal lattice plane, the existence of defects directly leads to decrease in corrosion resistance. The thickness of the innermost layer is preferably 1 nm or more.

In addition to carbon and boron nitride, the innermost inorganic layer may be formed by an oxide or a nitride of at least one element (element M) selected from the group consisting of Al, B, Ce, Co, Cr, Ga, Hf, In, Mn, Nb, Ti, V, Zr, Sc, Si, Y and Ta. Typical elements needing small activation energy for oxidation are Si, V, Ti, Al, Nb, Zr and Cr. Thus, the innermost layer may be formed by carbides, nitrides or oxides of these elements. Because the element M, which is more easily oxidized than Fe, Co and Ni, has a Gibbs free energy of forming an oxide, which meets the relation (1) described below, it can reduce oxides containing Fe, Co and Ni.

$$\Delta G_{(Fe,Co,Ni)-O} \geq \Delta G_{M-O} \qquad (1)$$

wherein $\Delta G_{(Fe,Co,Ni)-O}$ is a Gibbs free energy of forming oxides of Fe, Co and Ni, and $\Delta G_{M-O}$ is a Gibbs free energy of forming an oxide of the element M.

When the iron oxide is Fe$_2$O$_3$, the oxides, whose $\Delta G_{M-O}$ is smaller than $\Delta G_{Fe2O3}$ (−740 kJ/mol), are Al$_2$O$_3$, As$_2$O$_5$, B$_2$O$_3$, CeO$_2$, Ce$_2$O$_3$, Co$_3$O$_4$, Cr$_2$O$_3$, Ga$_2$O$_3$, HfO$_2$, In$_2$O$_3$, Mn$_2$O$_3$, Mn$_3$O$_4$, Nb$_2$O$_5$, TiO$_2$, Ti$_2$O$_3$, Ti$_3$O$_5$, V$_2$O$_3$, V$_2$O$_5$, V$_3$O$_5$, ZrO$_2$, Sc$_2$O$_3$, Y$_2$O$_3$, Ta$_2$O$_5$, rare earth oxides, etc.

[3] Formation of Metal Core and Innermost Inorganic Layer

The metal core and the innermost coating layer are produced by heat-treating fine oxide particles of Fe, Co, Ni, etc. together with carbon powder or boron powder in a non-oxidizing atmosphere such as a nitrogen gas, or a mixed gas of a nitrogen gas and an inert gas such as argon, etc.

Detailed explanation will be made, for instance, on fine composite metal particles having an average particle size of 1 μm or less, each of which comprises a metal core coated with carbon. The fine composite metal particles can be produced by heat-treating a mixture of oxide powder of Fe, Co, Ni, etc. and carbon powder in a non-oxidizing atmosphere. By this production method, the metal oxide is reduced, and graphite-based carbon with 2 or more crystal lattice planes is formed on the metal particles. 2 or more laminar crystal lattice planes are desirable to prevent the metal particles from being oxidized. More desirably, the carbon layer has 4 or more crystal lattice planes. The crystal lattice planes of carbon are preferably formed along a surface of each metal particle.

It appears that the transition metals, particularly Fe, Co and Ni, act as catalysts for forming the graphite layer. Accordingly, the above method has an extremely simplified step, as compared with conventional methods conducting the formation of fine metal particles and the coating of the fine metal particles with carbon by different steps, thereby preventing oxidation during the step. This method is effective to form fine composite metal particles, which are extremely active and thus easily oxidized.

The average particle size of the fine composite metal particles is desirably 0.001 to 10 μm, more desirably 0.001 to 1 μm, most desirably 0.01 to 0.1 μm. Particularly when the average particle size is 0.1 μm or less, the carbon coating exhibits a remarkable effect of preventing oxidation, and such effect is secured in a range of 0.01 to 0.1 μm. Because the fine magnetic metal particles suffer from little deterioration of magnetic properties by oxidation, they exhibit sufficient magnetization even when having multilayer coatings of inorganic materials, optimum for magnetic beads, etc.

The carbon layer of the fine composite metal particles has a thickness of preferably 100 nm or less, more preferably 50 nm or less, most preferably 40 nm or less. The magnetic metal core can be coated with a thin carbon layer, the saturation magnetization of the fine composite metal particles can be 10% or more and less than 100% of that of the magnetic metal. The fine composite metal particles coated with carbon have such high corrosion resistance that increase in the oxygen content after a heat treatment at a humidity of 100%, a temperature of 120° C. and 1 atm for 24 hours is 50% by mass or less relative to before the heat treatment. Thus, chemically stable fine composite metal particles can be obtained.

Carbon sources are suitably artificial or natural graphite, carbon black, etc., though they may be carbon-containing compounds such as coal, activated carbon, cokes, polymers such as aliphatic acids, polyvinyl alcohol, etc., B-C compounds, metal-containing carbides. Accordingly, it should be noted that the term "carbon powder" includes not only powder of pure carbon, but also carbon-containing compound powder. The powder of pure carbon is most preferable to have a high-purity carbon coating layer.

The metal oxide powder preferably has an average particle size of 0.001 to 10 μm, preferably 0.001 to 1 μm, particularly 0.01 to 0.1 μm. It is difficult to produce metal oxide powder having an average particle size of less than 0.001 μm, and thus it is not practical. When the average particle size exceeds 10 μm, it is difficult to sufficiently reduce the metal oxide powder to its center, failing to obtain uniform metal particles. The average particle size of carbon powder is preferably 0.01 to 100 μm, more preferably 0.1 to 50 μm. Carbon powder of less than 0.1 μm is too expensive. When the average particle size of carbon powder exceeds 100 μm, a uniform dispersion of the carbon powder in the mixed powder cannot be obtained, failing to uniformly coat the metal particles with carbon.

A mixing ratio of the metal oxide powder to the carbon powder is preferably such that the carbon powder is 25 to 95% by mass. When the carbon powder is less than 25% by mass, a sufficient reduction reaction does not occur because of insufficient carbon. On the other hand, when the amount of carbon powder exceeds 95% by mass, the volume ratio of the metal oxide powder to be reduced is impractically small.

The mixing of the metal oxide powder and the carbon powder may be carried out by a V-type mixer, a pulverizer such as a ball mill, a rotational mixer, a mortar, etc. The mixed powder is charged into a heat-resistant crucible of alumina, boron nitride, graphite, etc. together with a trasition metal oxide and heat-treated. The heat treatment atmosphere is a non-oxidizing atmosphere such as an inert gas, which may be a nitrogen gas, or a mixture of a nitrogen gas and another inert gas such as argon, etc. The heat treatment temperature is preferably 600° C. to 1600° C., more preferably 900° C. to 1400° C. The reduction reaction does not proceed at a temperature of lower than 600° C., and it takes too long time at a temperature of lower than 900° C. When it exceeds 1400° C. in an atmosphere free from oxygen, oxide ceramics of the crucible are likely to be decomposed to discharge oxygen, and an alumina crucible, for instance, is likely to be damaged. When it exceeds 1600° C., the crucible and adjacent facilities should be made of heat-resistant materials, resulting in extremely high production cost.

When the transition metal oxide and the carbon powder are heated at 600 to 1600° C. in a non-oxidizing atmosphere to produce the fine composite metal particles coated with carbon, the metal oxide acts as a catalyst for forming wire-shaped or tubular carbon micro-bodies having an average diameter of 0.5 μm or less as a byproduct. The term "carbon micro-bodies" includes nanotubes, nano-wires, nano-particles, and their aggregates. The wire-shaped or tubular carbon micro-bodies may have a graphite phase. The tubular carbon micro-bodies may have nodes or bridges. The metal oxide is desirably a magnetic metal oxide, and in this case, the resultant fine composite metal particles can magnetically be separated from the carbon micro-bodies.

The carbon micro-bodies may be hollow or solid, having an average diameter of desirably 0.01 to 0.5 μm, more desirably 0.05 to 0.5 μm, particularly 0.1 to 0.3 μm. The average diameter is determined from the outer diameters of the wire-shaped or tubular carbon micro-bodies. When the fine particles have noncircular cross sections, their maximum outer diameters and their minimum outer diameters are averaged to obtain the average particle size. when the carbon micro-body has a gradually changing diameter in a longitudinal direction, the maximum and minimum outer diameters in a longitudinal direction are taken to determine a middle diameter as its outer diameter. Part of the carbon micro-bodies largely deviating from a wire or tubular shape should be ignored in the determination of their outer diameters. The average diameter of the wire-shaped or tubular carbon micro-bodies is determined by measuring the outer diameters of the carbon micro-bodies in the number of N (N≧50) in an electron photomicrograph, and dividing the sum of the outer diameters by N.

Detailed explanation will then be made on fine composite metal particles having an innermost layer (first layer) of at least one element Z selected from the group consisting of Si, V, Ti, Al, Nb, Zr and Cr. A mixture of the magnetic metal oxide powder and the element Z powder is heat-treated in a non-oxidizing atmosphere such as Ar, He, $H_2$, $N_2$, $CO_2$, $NH_3$ or their combination.

The fine composite metal particles comprising Fe as a main component and further containing Co and/or Ni may be produced by using a mixture of iron oxide and oxide powder of Co and/or Ni, or by using a composite oxide powder of Fe and Co and/or a composite oxide powder of Fe and Ni. The iron oxide may be $Fe_2O_3$, $Fe_3O_4$, FeO, etc., the Co oxide may be $Co_2O_3$, $Co_3O_4$, etc., and the Ni oxide may be NiO, etc. The composite oxide of Fe and Co may be $CoFe_2O_4$, etc., and the composite oxide of Fe and Ni may be $NiFe_2O_4$, etc.

The powder containing the element M includes powder of a simple element M, and powder of carbides (M-C), borides (M-B) or nitrides (M-N). The average particle size of the element M-containing powder is preferably 1 to 10000 nm, more preferably 1 to 1000 nm, most preferably 10 to 100 nm for a more efficient reduction reaction. Though B and As are called "metalloid," they are included in the metal element here.

A mixing ratio of the oxide powder containing Fe and Co and/or Ni to the powder containing the element M (at least one selected from the group consisting of Al, B, Ce, Co, Cr, Ga, Hf, In, Mn, Nb, Ti, V, Zr, Sc, Si, Y and Ta) is preferably close to a stoichiometric ratio to reduce the oxides of Fe and Co and/or Ni. More preferably, the powder containing the element M is more than a stoichiometric amount. When the powder containing the element M is insufficient, the oxides of Fe and Co and/or Ni are not sufficiently reduced by the heat treatment, resulting in sintering of the element M particles and thus a bulky composite metal body.

The heat treatment may be conducted in a stationary electric furnace having a tubular chamber; an electric furnace having a furnace tube movable during the heat treatment, such as a rotary kiln, etc.; an apparatus for heating powder in a fluidized state; an apparatus for heating gravitationally falling fine particles by high-frequency plasma, etc. In any apparatus, the oxide powder is reduced to form the metal core and the first layer simultaneously. An additional inorganic layer is formed on the first coating layer to provide the multilayer-coated, fine, composite metal particles.

The simultaneous formation of the metal core and the first layer suppresses the oxidation of the metal core. The first coating layer makes it possible to obtain fine composite metal particles having extremely high corrosion resistance and oxidation resistance even from metals having poor corrosion resistance and oxidation resistance. While a silicon oxide-based layer is formed on the first coating layer of each fine composite metal particle, the metal core can be efficiency prevented from deterioration. The fine composite metal particles coated with the silicon oxide-based layer on the first coating layer have extremely high magnetic properties, corrosion resistance and oxidation resistance, when used as extraction media for nucleic acids.

[4] Inorganic Layer Outside Innermost Layer

The outermost layer of each fine composite metal particle is preferably a silicon oxide-based layer, not only to secure electric insulation between the particles, but also to have properties as an extraction carrier of nucleic acids. Though other insulating inorganic materials may be used, silicon oxide is most practical from the aspect of mass production at a low cost. Though the magnetic metal core is preferably coated with an inert inorganic material resistant to oxidation, etc., the outermost surfaces of the fine composite metal particles should be active to biosubstances such as DNA, etc., when used as biosubstance extraction media. From this aspect, the outermost layer is preferably composed of silicon oxide.

The silicon oxide may be obtained, for instance, by the hydrolysis reaction of silicon alkoxides. Specific examples of the silicon alkoxides are tetramethoxysilane, tetraethoxysilane, tetraisopropoxysilane, tetrabutoxysilane, methyltrimethoxysilane, methyltriethoxysilane, aminophenyltrimethoxysilane, aminopropyltrimethoxysilane, N-2-aminoethyl-3-aminopropyltrimethoxysilane, 3-triethoxysilyl-N-(1,3-dimethylbutylidene) propylamine, N-2-aminoethyl-3-aminopropyltriethoxysilane, N-2-aminoethyl-3-aminopropylmethyldimethoxysilane, N-phenyl-3-aminopropyltriethoxysilane, N-phenyl-3-aminopropyltrimethoxysilane, aminopropyltriethoxysilane, dimethyldiethoxysilane, dimethyldimethoxysilane, tetrapropoxysilane, phenyltriethoxysilane, etc. Tetraethoxysilane is a preferable silicon alkoxide to provide silicon oxide (silica) by a controlled hydrolysis reaction with good reproducibility. In addition, tetraethoxysilane provides a highly insulating coating at a relatively low cost. The silicon alkoxide may be used alone or in combination. For instance, aminopropyltrimethoxysilane and tetraethoxysilane may be used to form a silicon oxide layer with improved corrosion resistance.

In addition to silicon oxide, the outermost layer may be made of such electrically insulating inorganic oxides as alumina, titania, zirconia, etc. These coating layers may be formed by the hydrolysis method of metal alkoxides.

In the case of using tetraethoxysilane, the fine composite metal particles having the metal core coated with the first inorganic layer are dispersed in a solution of an alcohol, for instance, a lower alcohol such as ethanol, methanol, isopropanol, etc. To accelerate the hydrolysis reaction of tetraethoxysilane, an ammonia water is added as a catalyst. The ammonia water contains water in an amount equal to or more than a theoretical amount for 100% hydrolyzing tetraethoxysilane. Specifically, water is 2 mol or more per 1 mol of tetraethoxysilane. The amount of an alcohol solution used is preferably 100 to 10000 parts by mass per 100 parts by mass of tetraethoxysilane.

The amount of tetraethoxysilane used is preferably 5 to 80 parts by mass, more preferably 10 to 60 parts by mass, per 100 parts by mass of the fine composite metal particles. When tetraethoxysilane is less than 5 parts by mass, it is difficult to uniformly coat a surface of each fine composite metal particle with a silicon oxide layer. On the other hand, when tetraethoxysilane is more than 80 parts by mass, fine particles composed only of silicon oxide are formed in addition to the silicon oxide layer covering the fine composite metal particles.

The amount of water used for the hydrolysis of tetraethoxysilane is preferably 1 to 1000 parts by mass per 100 parts by mass of tetraethoxysilane. When it is less than 1 part by mass, the hydrolysis of tetraethoxysilane proceeds slowly, resulting in poor production efficiency. On the other hand, when it exceeds 1000 parts by mass, separate spherical particles of silicon oxide are undesirably formed.

The amount of the ammonia water used as a catalyst is preferably 10 to 100 parts by mass per 100 parts by mass of tetraethoxysilane, for instance, when the concentration of the ammonia water is 28%. When it is less than 10 parts by mass, the ammonia water fails to exhibit a catalytic function. On the other hand, when it is more than 100 parts by mass, separate spherical particles of silicon oxide are undesirably formed. The above dispersion of the fine composite metal particles is slightly alkaline with pH of about 11, because ammonia water and silicon alkoxide are contained. Accordingly, the metal particles may be corroded. However, the inorganic layer of each fine composite metal particle formed simultaneously with the metal core prevents the metal core from being corroded.

To coat the fine composite metal particles uniformly with silicon oxide, the alkoxide solution and the fine composite metal particles are fully mixed using a motor stirrer, a V-type mixer, a ball mill, a dissolver, or an ultrasonic machine, etc. The mixing should be conducted longer than necessary for the hydrolysis of tetraethoxysilane reaction. To increase the intensity of the coating layer, it is preferable to heat-treat the coated fine composite metal particles.

The silicon oxide layer has an amorphous structure. The average thickness of the silicon oxide layer is preferably determined such that the average thickness of the multilayer inorganic coating comprising the innermost layer and the silicon oxide layer is 500 nm or less. To obtain a sufficient magnetic force, the saturation magnetization of the fine composite metal particles is preferably 10% or more of that of the magnetic metal. When the average thickness of the multilayer inorganic coating exceeds 500 nm, the fine composite metal particles have a decreased saturation magnetization. More preferably, the average thickness of the silicon oxide layer is 100 nm or less. When the fine composite metal particles of the present invention are used as biosubstance-extracting media, which are called "magnetic beads," the minimum thickness of the silicon oxide layer is 5 nm, such that sufficient chemical properties are exhibited, for instance, its surface potential ($\zeta$ potential) defined from the aspect of an electric double layer is the same as that of silicon oxide.

The thickness of the coating layer is a distance between the surface of the metal core and the coating surface. The thickness of the coating layer is measured, for instance, by TEM. The TEM observation of a sample particle reveals that there is contrast between the metal core, the innermost layer of carbon and/or boron nitride and the silicon oxide layer, indicating that the carbon and/or boron nitride layer and the silicon oxide layer are formed on the metal core surface. The average thickness is determined from 10 or more of the fine composite metal particles. With respect to each particle, the thickness of the layer is measured at 4 or more points, and averaged to determine the average thickness.

When a periodically arranged lattice is not observed in the silicon oxide layer by high-resolution electron microscopic observation, it is confirmed that the silicon oxide has an amorphous structure. The formation of the silicon oxide layer on the fine metal particle surface can be confirmed, for instance, by element analysis such as energy-dispersive X-ray fluorescence (EDX) analysis, etc., or infrared spectroscopy. The TEM observation of the fine composite metal particle and the EDX analysis of the coating layer can confirm that the layer is composed of silicon oxide. The infrared absorption spectrum of the fine composite metal particles reveals that there is an absorption peak of silicon oxide at a wave number of 1250 to 1020 cm$^{-1}$, confirming the formation of the silicon oxide layer.

The average particle size of ultrafine particles can be determined, for instance, by dispersing an ultrafine particle sample in a solvent, irradiating laser beams onto the sample to measure a particle size distribution by diffraction. A measured median diameter d50 is used as an average particle size. When the particle size is as small as 100 nm or less, a sample is observed by TEM or a scanning electron microscope (SEM) to take its electron photomicrograph, in which the sizes of particles are measured in an arbitrary area to obtain an average particle size. The average particle size is determined from 50 or more of the measured particles. When the fine particles have noncircular cross sections, their maximum outer diameters and their minimum outer diameters are averaged to obtain the average particle size.

When the silicon oxide layer is formed by the hydrolysis of tetraethoxysilane, the thickness of the silicon oxide layer depends on the amounts of tetraethoxysilane, water and a catalyst. The excess amount of silicon oxide forms separate particles. The thickness of the silicon oxide can be increased by adding an electrolyte. Specific examples of the electrolyte are KCl, NaCl, LiCl, NaOH, etc. With a controlled amount of the electrolyte, the thickness of the silicon oxide can be adjusted in a range of 5 to 400 nm. The silicon oxide layer thicker than 400 nm decreases the saturation magnetization of the fine composite metal particles. The more preferred thickness of the silicon oxide layer is 5 to 100 nm.

An inorganic material outside the innermost layer may be a gold layer in place of the silicon oxide layer. The gold layer may further be formed on the silicon oxide layer. Fine colloidal gold particles need only be applied to the coating layer, and the resultant gold layer may be heat-treated. The first coating layer may be plated with Ni, etc. and then with Au.

[5] Resin Layer

The multilayer inorganic coating may be covered with a resin. The resin coating may be formed by the precipitation polymerization of monomers such as monofinctional vinyl monomers The monofunctional vinyl monomers may contain polyfunctional vinyl monomers in a range causing substantially no cross-linking, for instance, less than 0.5 mol % of the total monomers. The resin coating is particularly a polystyrene resin coating. The resin-coated fine composite metal particles may be aggregated to have a controlled secondary particle size. The above-described silicon oxide layer may be formed on the resin coating.

An intermediate layer of a resin may be formed between the innermost layer in contact with the metal core and the outer inorganic layer. Specifically, the metal core may be coated with an innermost layer of carbon and/or boron nitride, or at least one element selected from the group consisting of Si, V, Ti, Al, Nb, Zr and Cr, a resin layer, and then a silicon oxide layer. With the resin coating, the particle size and specific gravity of the fine composite metal particles can be controlled.

The outermost layer is preferably a silicon oxide layer, a gold layer or a resin layer, though all the fine composite metal particles need not be coated with such layers. In addition, each fine particle is preferably completely coated, though all the fine composite metal particles need not be coated. The coating ratio of the particles is preferably 90% or more. The coating ratio is calculated by (n/N)×100(%), wherein N is the total number of particles, and n is the number of particles, 50% or more of whose surfaces are coated with silicon oxide. When there are a small percentage of particles coated with silicon oxide, the effect of improving oxidation resistance and corrosion resistance is low. Thus, the coating ratio by silicon oxide is more preferably 95% or more. The fine composite metal particles of the present invention having a multilayer coating of 2 or more different inorganic materials have such good corrosion resistance that the degradation of saturation magnetization is 10% or less in a corrosion resistance test under the conditions of a temperature of 120° C. and a humidity of 100% for 12 hours, exhibiting stable properties as magnetic beads.

[6] Surface Modification

The silicon oxide layer may be treated with amino-group-containing silane coupling agents to have functional groups such as —NH$_2$, etc. The silane coupling agents may be specifically γ-aminopropyltrialkoxysilane, N-β-(aminoethyl)-γ-aminopropyltrialkoxysilane, N-β-(aminoethyl)-γ-aminopropyl methyl dialkoxysilane, N-phenyl-γ-aminopropyltrialkoxysilane, γ-aminopropyltriethoxysilane, or N-(β-aminoethyl)-γ-aminopropyltrimethoxysilane. With functional groups such as —NH$_2$, —OH, —COOH, etc. on the surface of the silicon oxide layer, the fine composite metal particles have an improved function of extracting biosubstances.

The fine composite metal particles of the present invention, particularly those having a silicon oxide layer and optionally a surface-modifying layer of —NH$_2$, —OH, —COOH, etc. outside the inorganic layer, are chemically stable with high saturation magnetization. Accordingly, they are suitable for the extraction of biosubstances as so-called magnetic beads.

The present invention will be described in further detail referring to EXAMPLES below without intention of restricting the present invention thereto.

EXAMPLE 1

Figure 2:
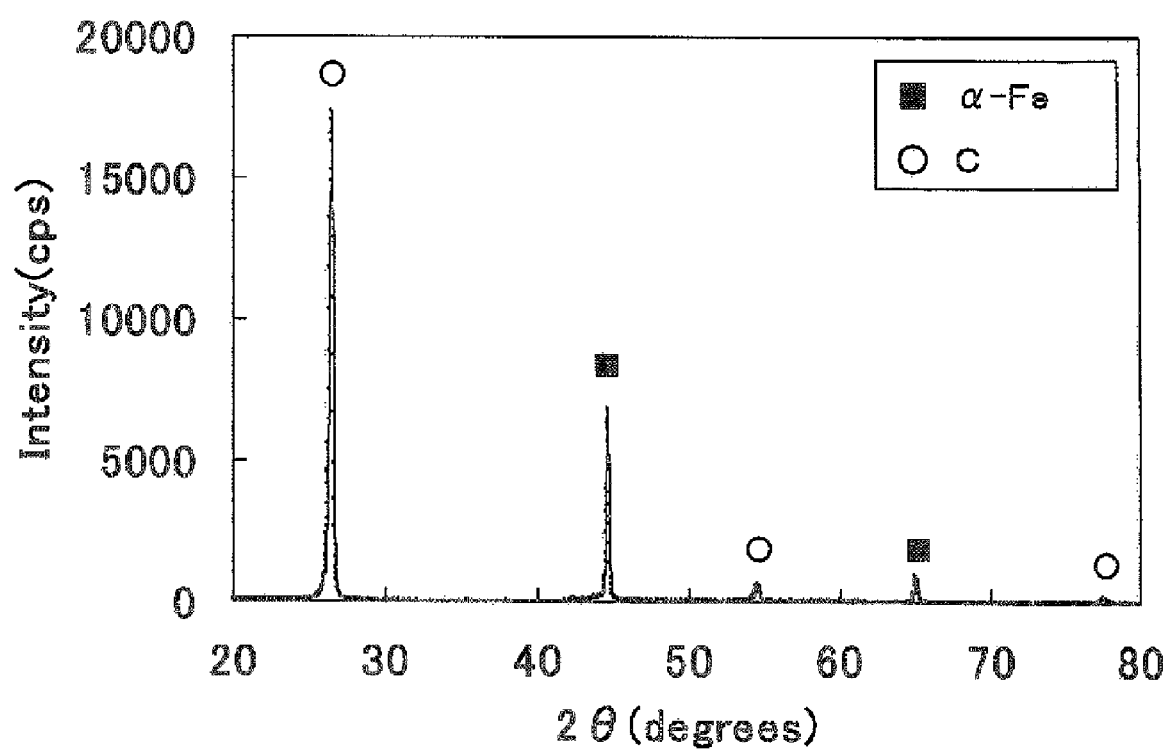
FIG. 2 is a graph showing the X-ray diffraction pattern of the mixed powder after the heat treatment.

5 g of α-Fe$_2$O$_3$ powder (metal oxide powder) having an average particle size of 0.03 μm and 5 g of carbon powder having an average particle size of 20 μm were mixed for 10 minutes in a V-type mixer. The resultant mixed powder was charged in a proper amount into a boron nitride crucible, and the crucible was placed in a tubular furnace, in which the mixed powder was heated from room temperature at a rate of 3° C./min. kept at 1000° C. for 2 hours, and then cooled to room temperature at a rate of 3° C./min. in a nitrogen gas stream at a flow rate of 2 L/min. With respect to each carbon powder before and after the heat treatment, an X-ray diffraction measurement (Cu, Kα lines) was conducted to obtain diffraction patterns shown in FIG. 1 (before the heat treatment) and FIG. 2 (after the heat treatment). (002) Peaks of graphite and (110) peaks of α-Fe were mainly detected in the heat-treated powder. The magnetic properties of the heat-treated powder were measured by a sample-vibrating magnetometer (VSM). The results are shown in Table 1. The saturation magnetization was about 100 times larger in Example 1 than in Comparative Example 1, and this result in combination with the result of the X-ray diffraction measurement indicates that $Fe_2O_3$ was reduced to Fe. After the heat-treated powder was placed at 100% RH, 120° C., and 1 atm for 24 hours in a pressure cooker test machine, the oxygen content in the powder was analyzed by an analyzer of oxygen, nitrogen and hydrogen in metals (EMGA-1300 available from Horiba Ltd.). The analysis results of the oxygen content are shown in Table 2. There was no increase in the oxygen content after the pressure cooker test, indicating that Fe powder was coated with a graphite layer. Incidentally, the above analysis of oxygen, nitrogen and hydrogen in metals comprises charging 0.5 g of a powder sample into a graphite crucible, rapidly heating the crucible to 2000 to 3000° C. to thermally decompose the sample to generate a gas containing $CO_2$, $N_2$ and $H_2O$, and detecting them by a chromatograph and a heat conductivity detector to analyze the amounts of O, N and H.

COMPARATIVE EXAMPLE 1

The mixed powder was heat-treated and subjected to an X-ray diffraction measurement, a VSM measurement and a pressure cooker test in the same manner as in Example 1 except for changing the heat treatment temperature to 500° C. There was no change in an X-ray diffraction pattern before and after the heat treatment, suggesting that no reaction occurred. The saturation magnetization was not substantially changed either.

COMPARATIVE EXAMPLE 2

Fe powder having an average particle size of 0.02 μm (ultrafine particles available from Vacuum Metallurgical Co., Ltd.) was subjected to a corrosion resistance test under the same conditions as in Example 1. The saturation magnetization was reduced to $75.4 \times 10^{-6}$ Wb·m/kg, about 30% of the pure iron level (about $260 \times 10^{-6}$ Wb·m/kg).

TABLE 1

| No. | Saturation Magnetization (Wb · m/kg) | Coercivity (kA/m) |
| --- | --- | --- |
| Example 1 | $131 \times 10^{-6}$ | 8.04 |
| Comparative Example 1 | $1.30 \times 10^{-6}$ | 140 |
| Comparative Example 2 | $75.4 \times 10^{-6}$ | 135 |

TABLE 2

| | Amount of Oxygen (% by mass) | |
| --- | --- | --- |
| No. | Before Corrosion Resistance Test | After Corrosion Resistance Test |
| Example 1 | 0.11 | 0.11 |
| Comparative Example 1 | 15.0 | 15.2 |
| Comparative Example 2 | 10.8 | 27.5 |

Figure 3:
FIG. 3 is an electron photomicrograph showing the particle of the present invention structure.
Figure 4:
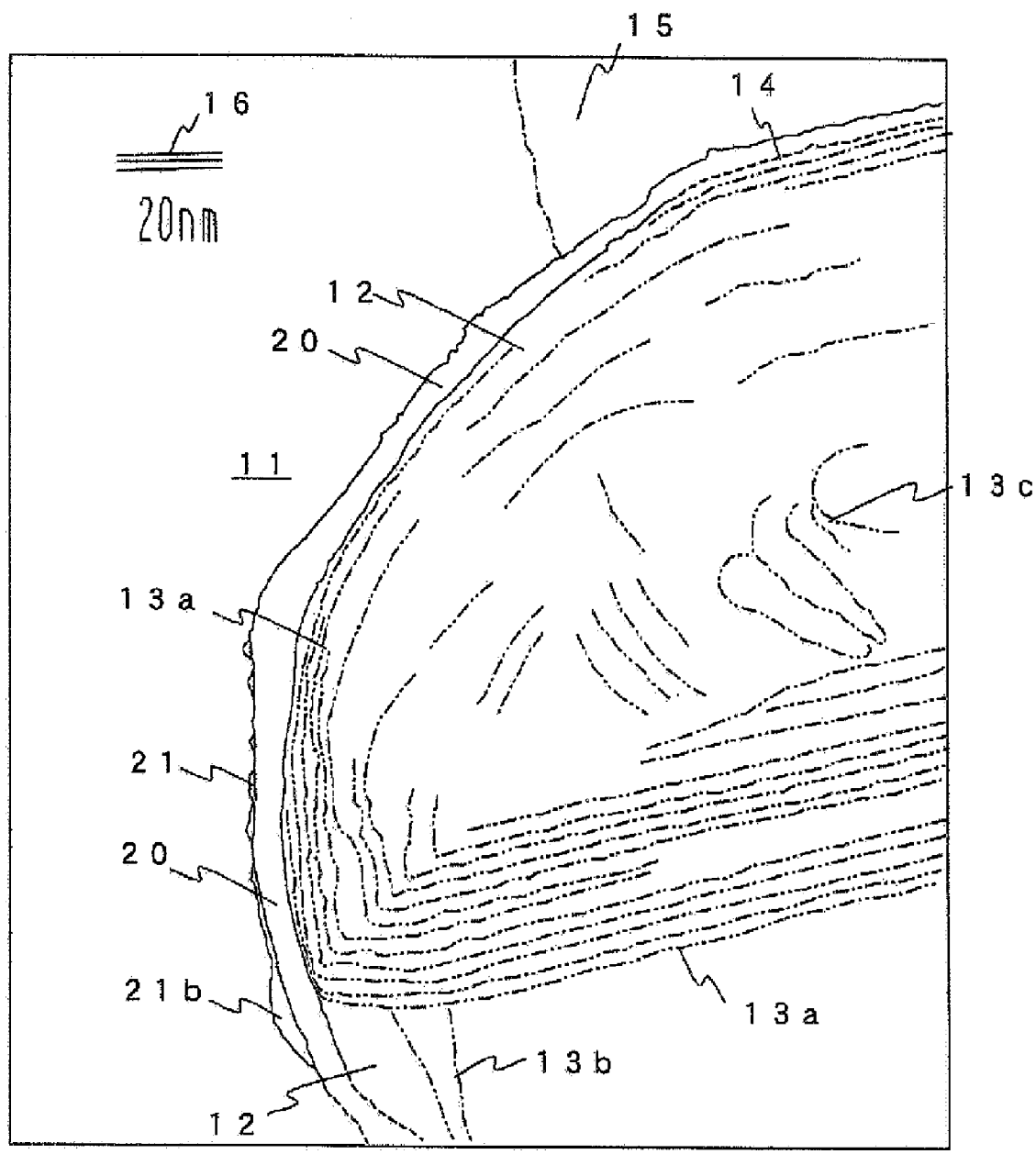
FIG. 4 is a schematic view for explaining the structure of the particle shown in FIG. 3.

FIG. 3 is an electron photomicrograph showing the structure of ultrafine metal particle of Example 1, which was observed by TEM. In the TEM observation, no work likely to damage or change the particles was carried out at all except for necessary adjustment of the sample. FIG. 4 is a slightly enlarged schematic view for explaining the structure in FIG. 3. Ultrafine metal particles 11 were α-Fe particles 12 each entirely coated with a thin graphite layer 20. This coating layer 20 effectively prevents the oxidation of each α-Fe particle 12. It is presumed that projections 21, 21b on the thin graphite layer 20 are those grown from the graphite layer or foreign matter attached to the graphite layer. Bright and dark stripes 13a, 13b, 13c on the α-Fe particles 11 are an interference pattern (shown by phantom lines) due to the substantially spherical shape of the α-Fe particles 11. Because boundaries 14 of the thin graphite layer are slightly unclear on both ends of the α-Fe particles, they are shown by dotted lines. This is because perfect focusing is difficult on substantially spherical shapes, not suggesting that the α-Fe particles 11 actually have obscure shapes. A region encircled by a dashed line is a collodion layer 15 for fixing the ultrafine metal particles 11 to a sample holder for TEM observation. FIG. 4 indicates that three lines 16 are as long as 20 nm. A scale, on which the photograph of FIG. 3 was taken, is copied to FIG. 4.

Figure 5:
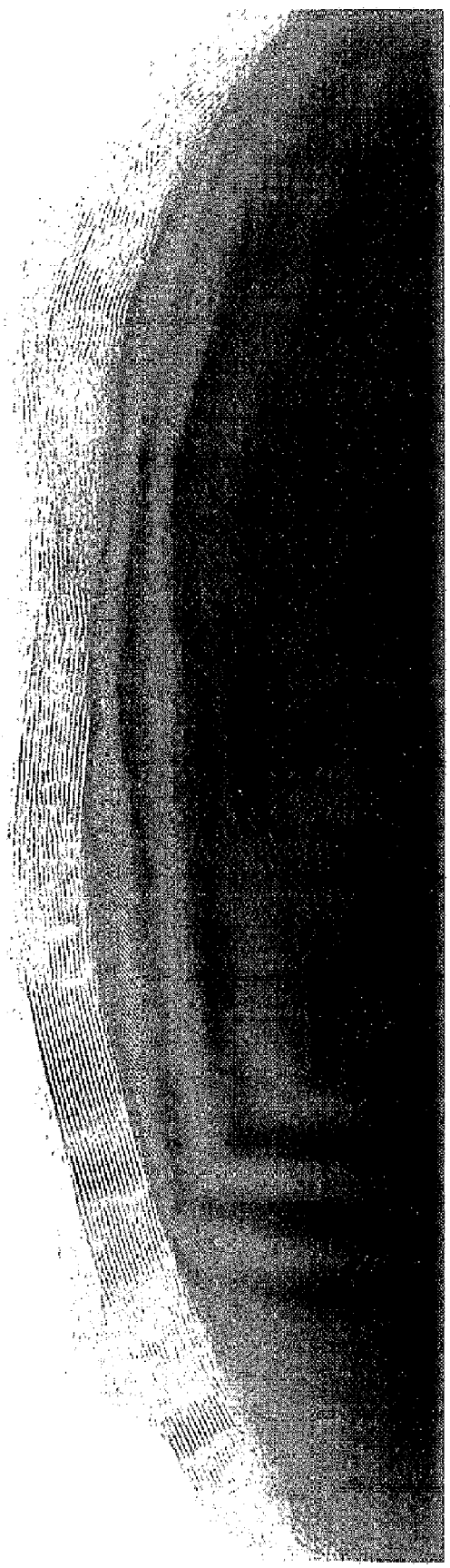
FIG. 5 is an electron photomicrograph showing the particle of the present invention structure.
Figure 6:
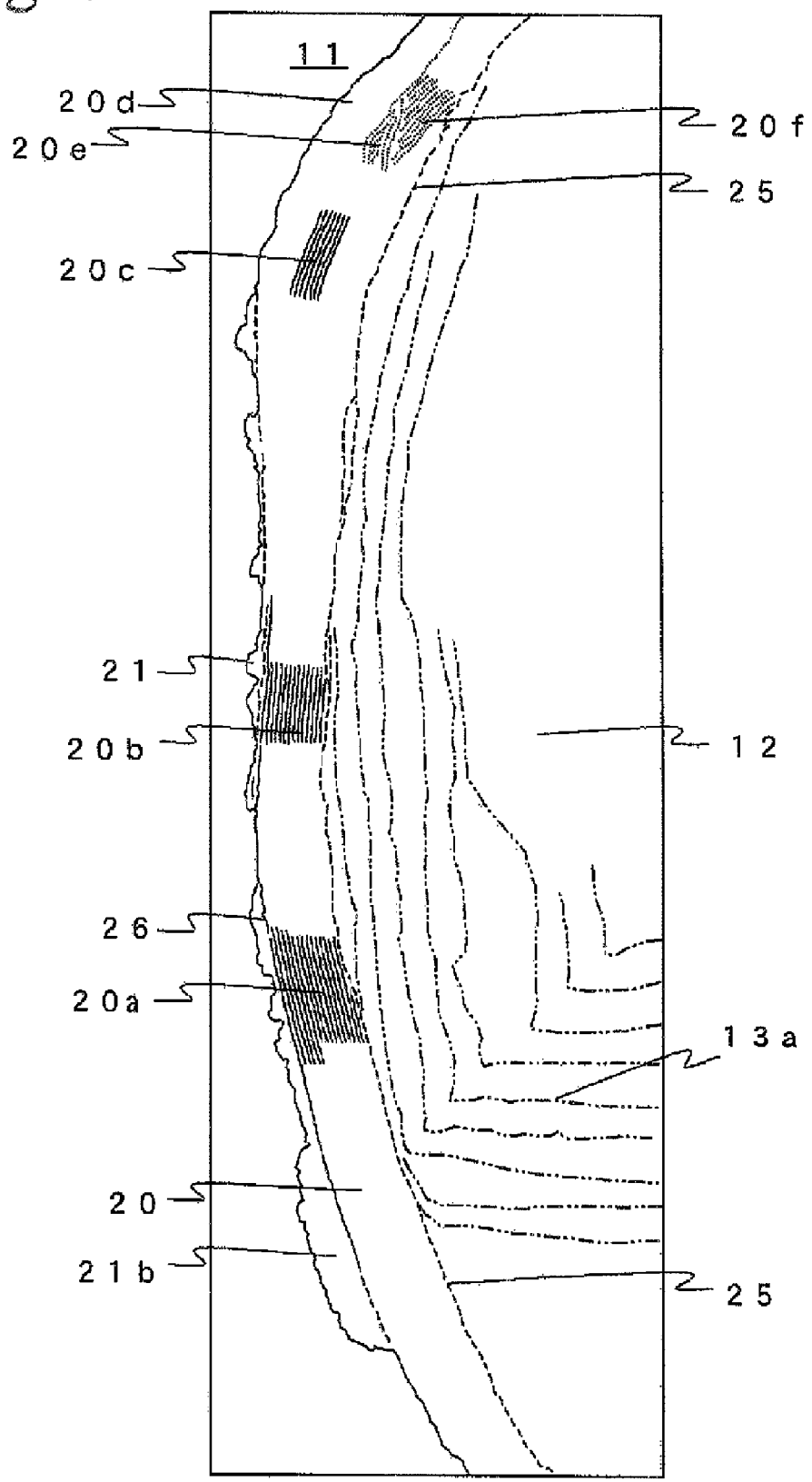
FIG. 6 is a schematic view for explaining the structure of the particle shown in FIG. 5.

FIG. 5 is a TEM photomicrograph showing the structure of the particle of the present invention, which shows a lower left portion in FIG. 3 in an enlarged manner to scrutinize the structure of the thin graphite layer 20. FIG. 6 is a schematic view for explaining the structure of the particle shown in FIG. 5. A thin graphite layer 20 is mainly constituted by graphite crystals. For instance, lattice fringes 20a, 20b, 20c with substantially equal intervals indicate laminar lattice planes of graphite, substantially in parallel to the surface of the α-Fe particle 12.

Because the α-Fe particle is spherical and has slight raggedness on its surface, some part of the thin graphite layer is inclined to the surface of the α-Fe particle 12, like lattice fringes 20f. The lattice fringes 20f generate other lattice fringes 20e and further lattice fringes 20d. Though not shown in the figure, the lattice fringes 20d are substantially in parallel to the surface of the α-Fe particle 12. As shown in FIGS. 5 and 6, the laminar lattice planes have varied orientations, and some of them (satin portions) are obscure in their orientations in the thin graphite layer. A substantially uniform thin graphite layer was formed, such that crystals grow with adjacent crystals aligned and with surfaces in parallel to the surface of the α-Fe particle 12.

FIG. 6 schematically indicates part of lattice fringes by solid lines and dotted line in the thin graphite layer 20. Though not shown in the figure, there are crystals even in blank portions. It is presumed that there is an intermediate layer 25 between the surface of the α-Fe particle 12 and the thin graphite layer 20, and its details are explained referring to FIGS. 7 and 8.

Figure 7:
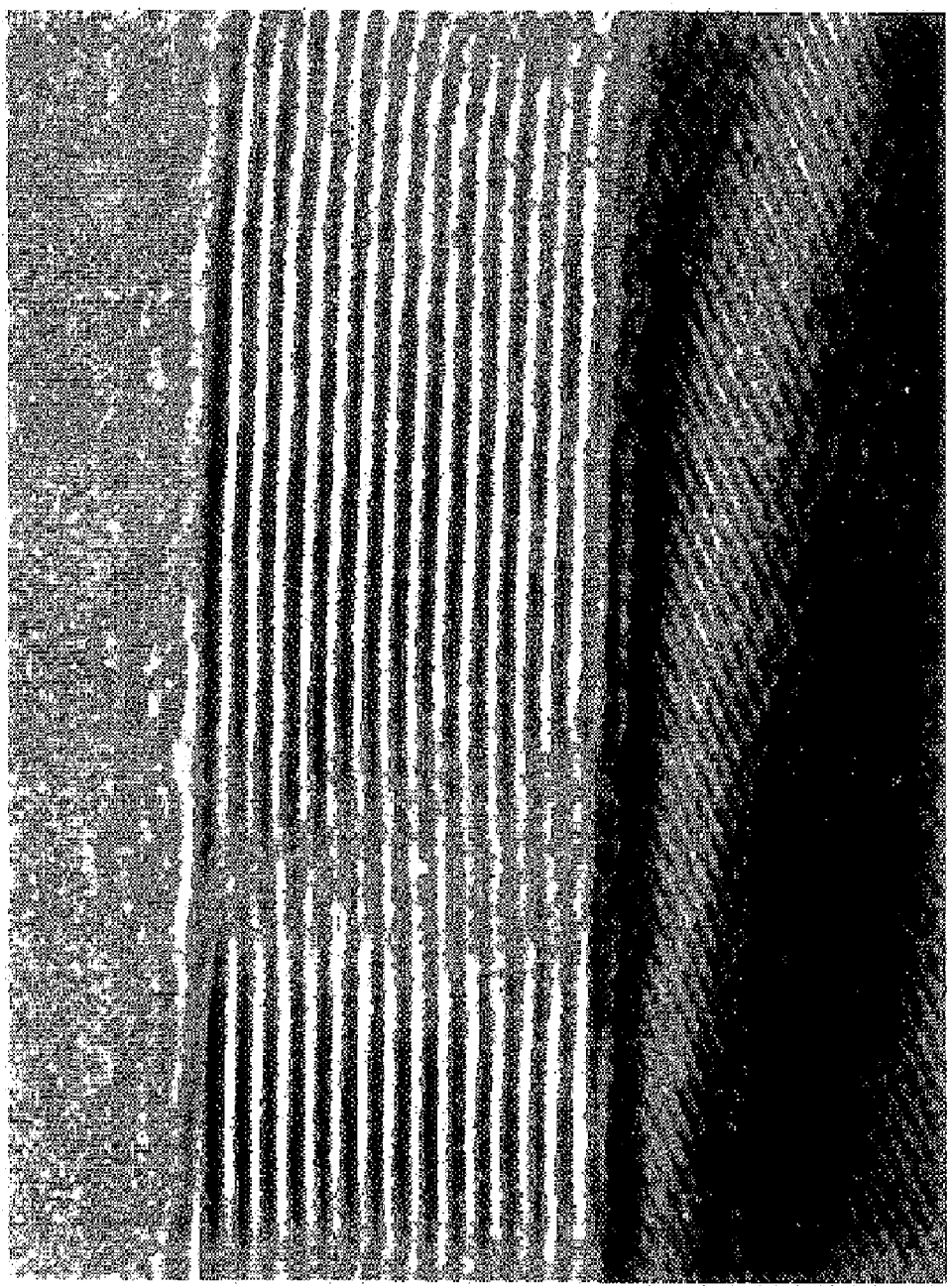
FIG. 7 is an electron photomicrograph showing the particle of the present invention structure.
Figure 8:
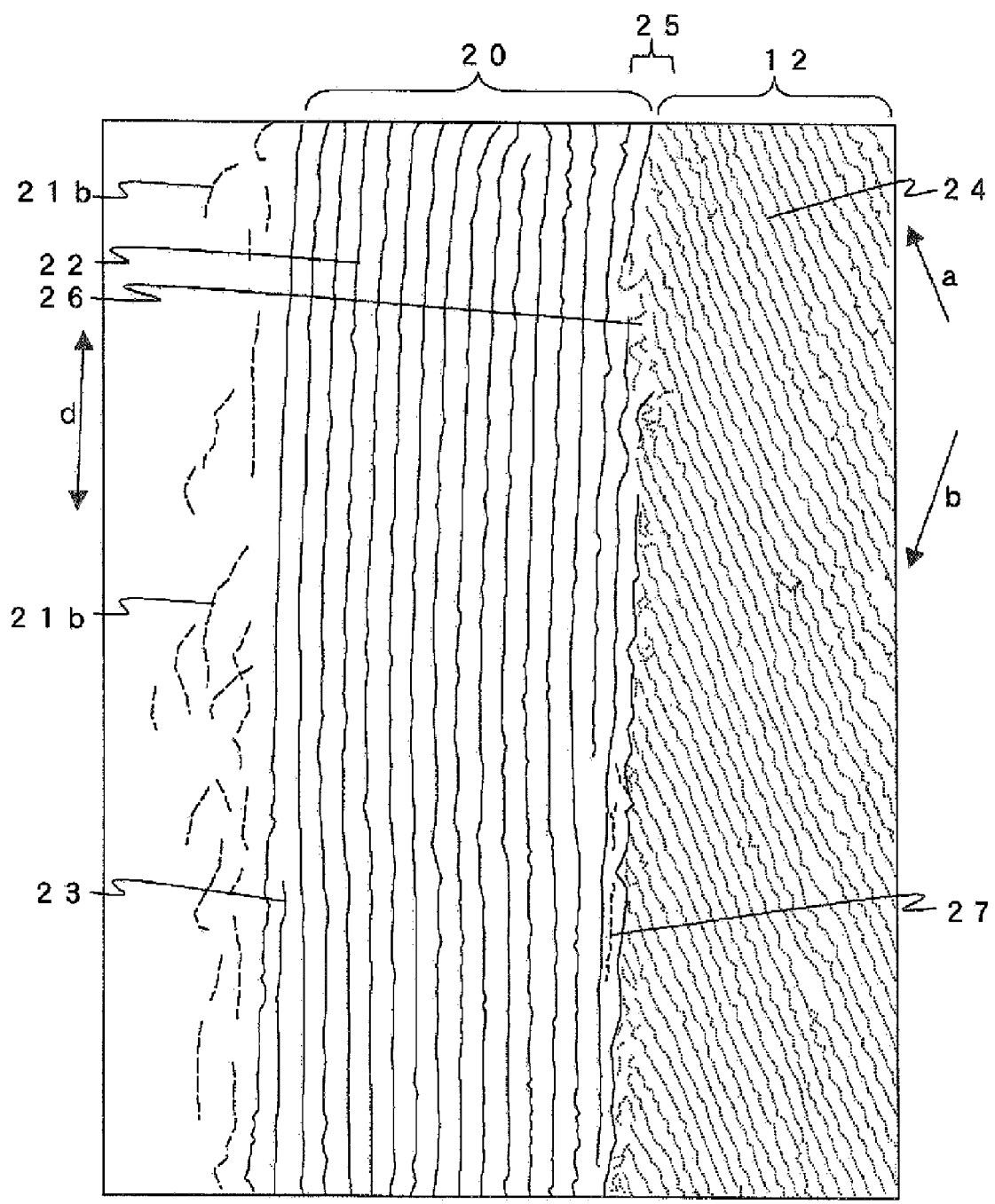
FIG. 8 is a schematic view for explaining the structure of the particle shown in FIG. 7.

FIG. 7 is a TEM photomicrograph showing the structure of the particle of the present invention, which shows the thin graphite layer 20 in FIG. 5 in an enlarged manner. FIG. 8 is a slightly enlarged schematic view showing the structure in FIG. 7. The α-Fe particle 12 has lattice fringes 24 along the arrow a, indicating crystal planes peculiar to α-Fe. The arrangement of Fe atoms in row is shown by dotted lines. Though the lattice fringes along the arrow a are disturbed near the surface of the α-Fe particle 12, their ends constitute flat surfaces as sites, from which graphite crystals gradually grow. This region is called an intermediate layer 25. The thin graphite layer 20 grows via the intermediate layer 25.

If the α-Fe particle 12 has a relatively smooth spherical surface (flat surface) as shown in FIG. 8, the laminar lattice planes 22 of graphite regularly grow in parallel along the arrow d, resulting in a dense and extremely thin coating. The term "dense" used herein means that the coating has portions in which regular lattice planes are laminated. 15 to 17 laminar lattice planes were laminated in a direction perpendicular to the arrow d to constitute an extremely thin coating. It seems that the intermediate layer 25 was as thick as 1 or 2 layers in the laminar lattice planes 22 of graphite. When graphite crystal planes just starting to grow are included in the intermediate layer, the intermediate layer 25 is as thick as about 2 to 4 layers in the laminar lattice planes 22 of graphite.

It is presumed that dislocations 23 are portions having discontinuity in the crystal structure because of uneven crystal growth. When growth in a portion delays by one layer due to lattice defects and then resumes in the course of growth of laminar lattices, it is likely that a lattice plane of the (n−1)-th layer in the portion merges with a lattice plane of the n-th layer in an adjacent portion into one plane (dislocated plane). When the formation of dislocated planes is scarce, the resultant layer is a uniform, dense, thin layer as a whole, Though there are projections 21b on the thin graphite layer 20, their clear photograph was not taken. Accordingly, they are shown by dotted lines in FIG. 7.

EXAMPLE 2

5 g of $\alpha$-$Fe_2O_3$ powder (metal oxide powder) having an average particle size of 0.03 μm and 5 g of carbon powder having an average particle size of 20 μm were mixed for 10 minutes in a V-type mixer. A proper amount of the resultant mixed powder charged into a boron nitride crucible was heated from room temperature at a rate of 3° C./min. in a nitrogen gas stream at a flow rate of 2 L/min. in a tubular furnace, kept at 1000° C. for 2 hours, and cooled to room temperature at a rate of 3° C./min. in the furnace.

Figure 9:
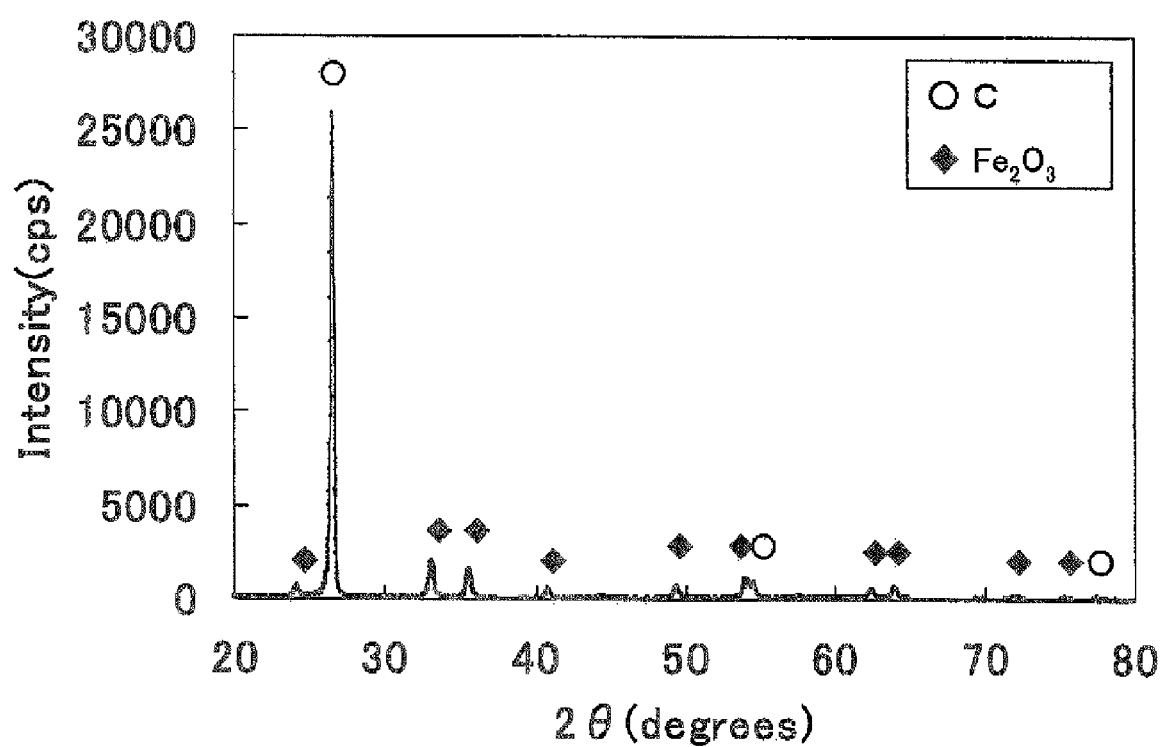
FIG. 9 is a graph showing the X-ray diffraction pattern of the mixed powder before the heat treatment.
Figure 10:
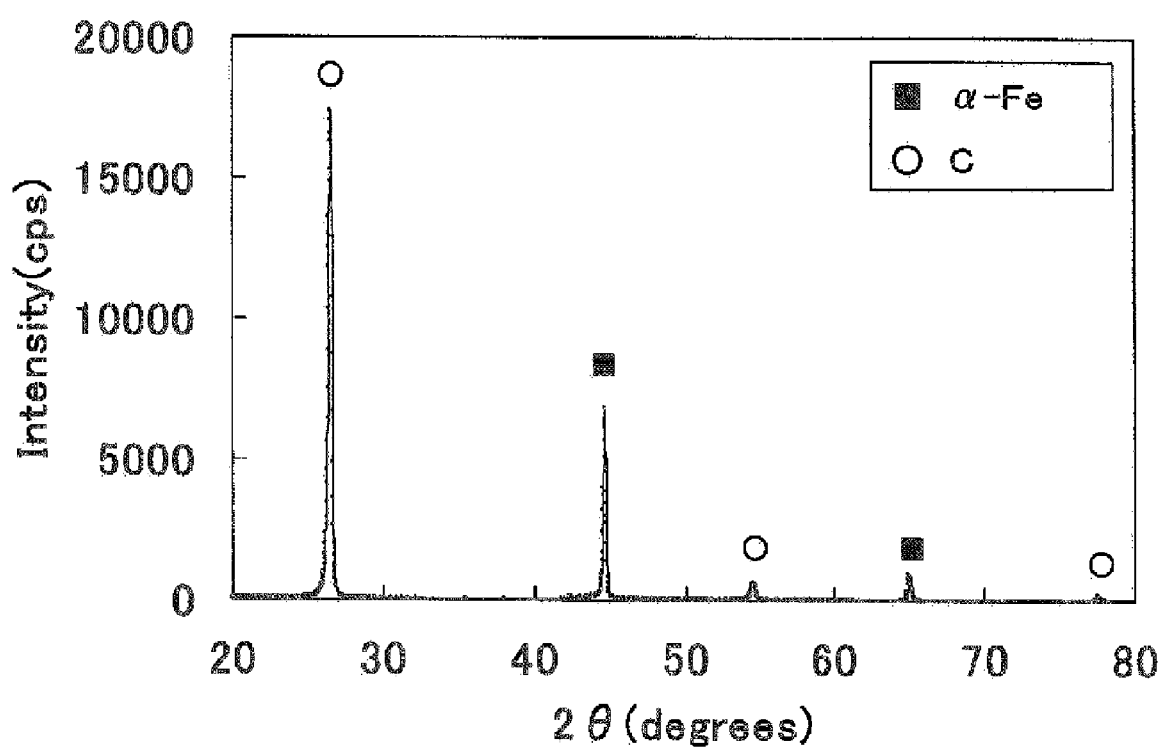
FIG. 10 is a graph showing the X-ray diffraction pattern of the mixed powder after the heat treatment.

With respect to each carbon powder before and after the heat treatment, an X-ray diffraction measurement (Cu, K$\alpha$ lines) was conducted to obtain diffraction patterns shown in FIG. 9 (before the heat treatment) and FIG. 10 (after the heat treatment). (002) Peaks of graphite and (110) peaks of $\alpha$-Fe were mainly detected in the heat-treated powder. In FIG. 10, white circles denote peaks corresponding to the crystal structure of graphite, black squares denote peaks corresponding to the crystal structure of $\alpha$-Fe, the axis of abscissas indicates a diffraction angle 2θ (°), and the axis of ordinates indicates an X-ray diffraction intensity (cps). A maximum-intensity peak of graphite has a half-width of about 0.2°, indicating that the heat-treated powder has good crystallinity. With respect to the powder shown in FIGS. 9 and 10 (before and after the heat treatment), the measurement of magnetic properties by VSM revealed that the saturation magnetization was $1.30 \times 10^{-6}$ Wb·m/kg before the heat treatment, and $131 \times 10^{-6}$ Wb·m/kg after the heat treatment, indicating that $Fe_2O_3$ was reduced to Fe.

Figure 11:
FIG. 11 is an electron photomicrograph showing the particle of the present invention structure.

The TEM observation of the heat-treated powder confirmed tubular a carbon micro-bodies as shown in FIG. 11. FIG. 11 is an electron photomicrograph showing the structure of the particle of the present invention. The composition analysis by EDX revealed that black particles at ends of the carbon micro-bodies are Fe, and that the tubes are C (carbons).

Figure 12:
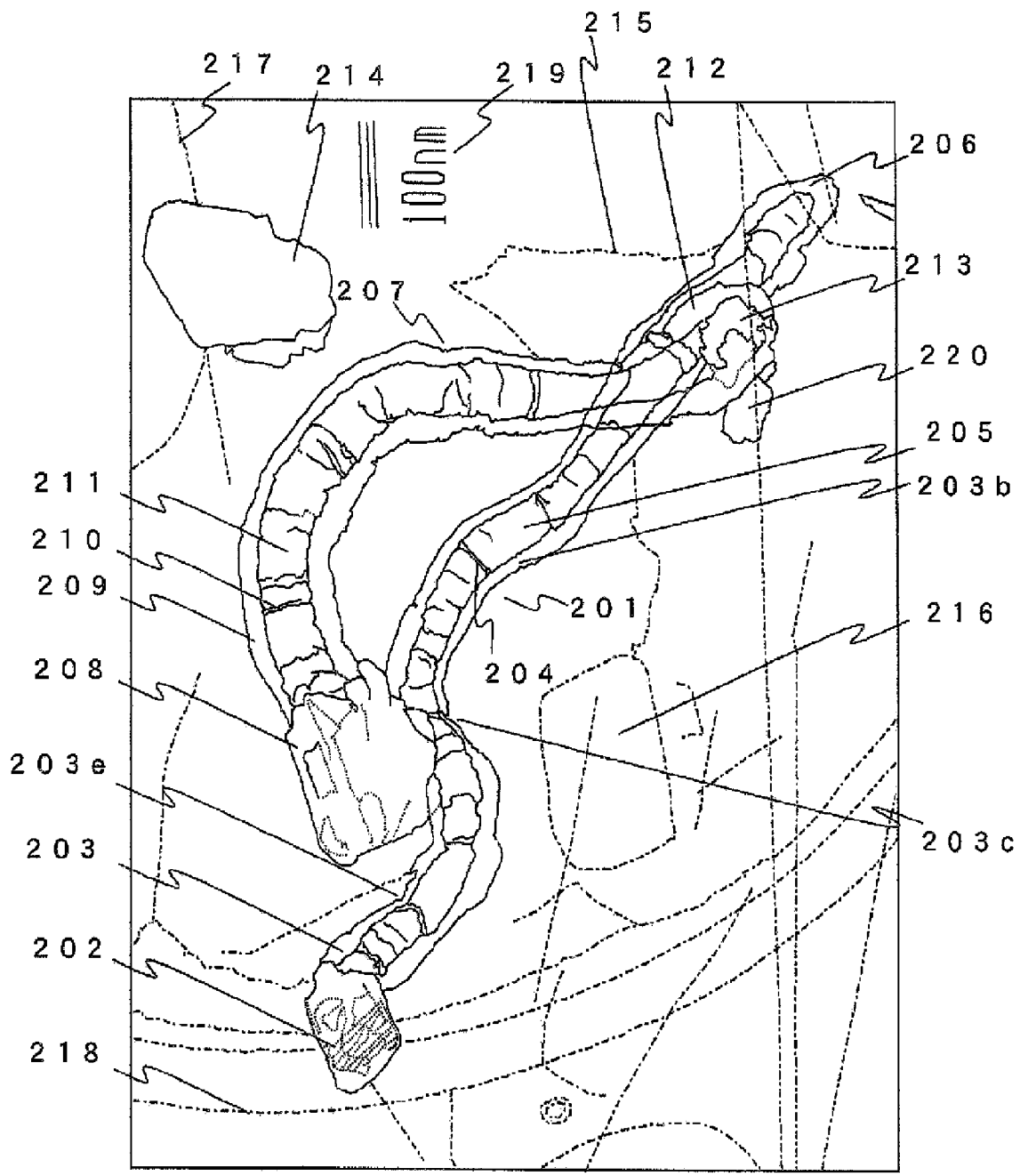
FIG. 12 is a schematic view for explaining the structure of the particle shown in FIG. 11.

FIG. 12 is a schematic view corresponding to the particle structure in the photograph of FIG. 11. A carbon micro-body 201 is a carbon tube 203 grown from an Fe particle 202 in a curved manner. There are pluralities of nodes 204 in the tube 203, regions surrounded by opposing nodes and tube wall 203b constituting cavities 205. A tip end 206 of the tube 203 is closed. The curved carbon micro-body 201 appears to suggest that the thickness of the tube wall and the interval of the nodes are not uniform. The tube wall is thin particularly in portions 203c, 203e.

Another carbon micro-body 207 is a carbon tube 209 grown from an Fe particle 208 in a curved manner and containing an Fe particle 213 at a tip end. There are pluralities of nodes 211 in the tube 209, regions surrounded by opposing nodes and the tube wall constituting cavities 211. The Fe particle 220 near the Fe particle 213 appear to be separated from each other by the tube wall 220, etc. It is not clear whether the Fe particle 213 in the carbon micro-body 207 was attached to the tube from the beginning of growth or taken during the course of growth. Though the Fe particle 208 and the tube wall 212 look overlapping the carbon micro-body 201, they are not connected with each other. The other Fe particle 214 exists alone. In the figure, straight or curved dashed lines 215, 216 define the profiles of carbon particles. Curved dashed lines 217, 218 define the profiles of collodion layers for fixing the carbon micro-bodies, etc. onto a sample holder of an electron microscope. The reference numeral 219 denotes a scale in FIG. 12. Three lines for indicating the scale are as long as 100 nm.

Figure 13:
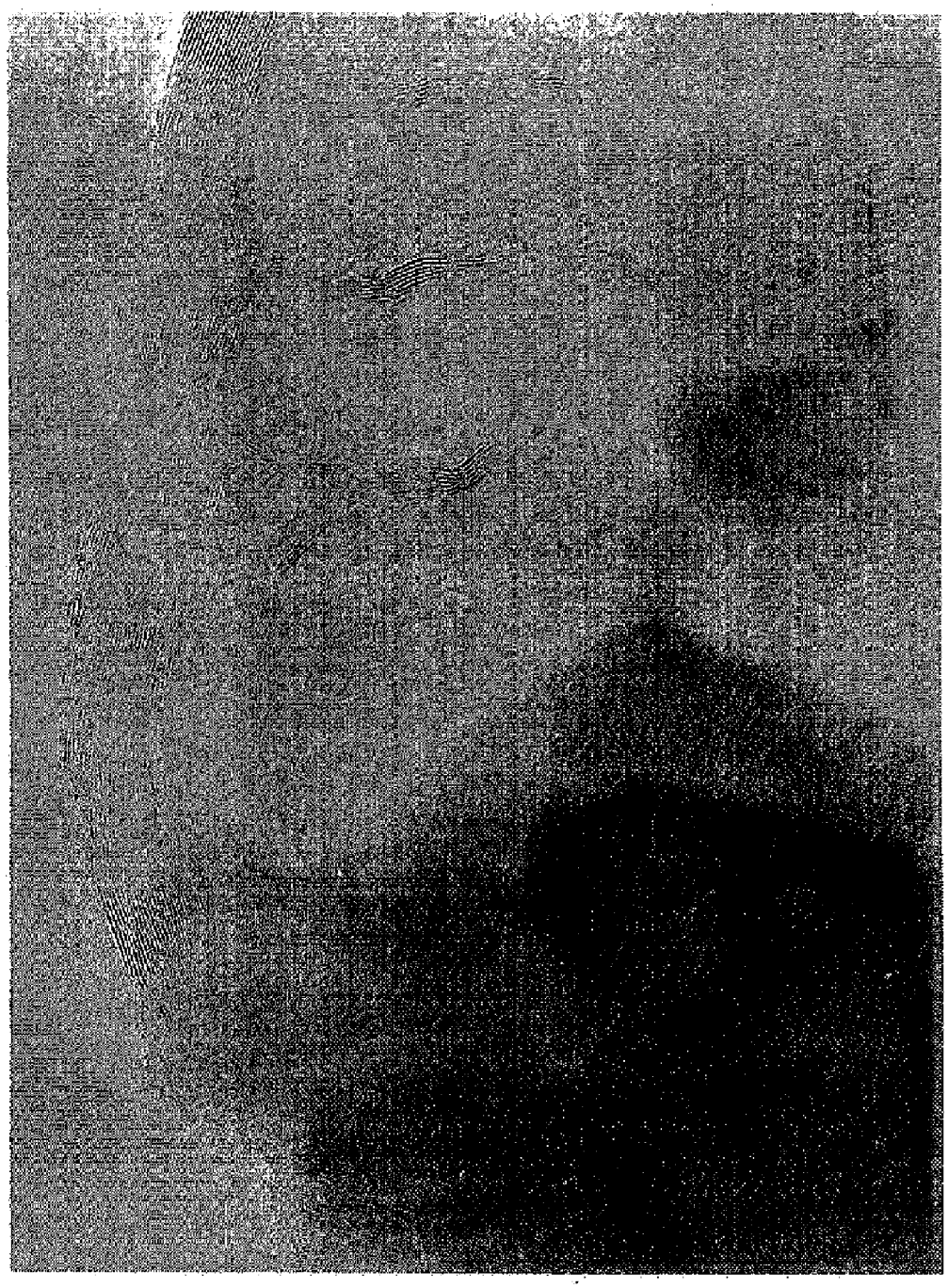
FIG. 13 is an electron photomicrograph showing the particle of the present invention structure.
Figure 14:
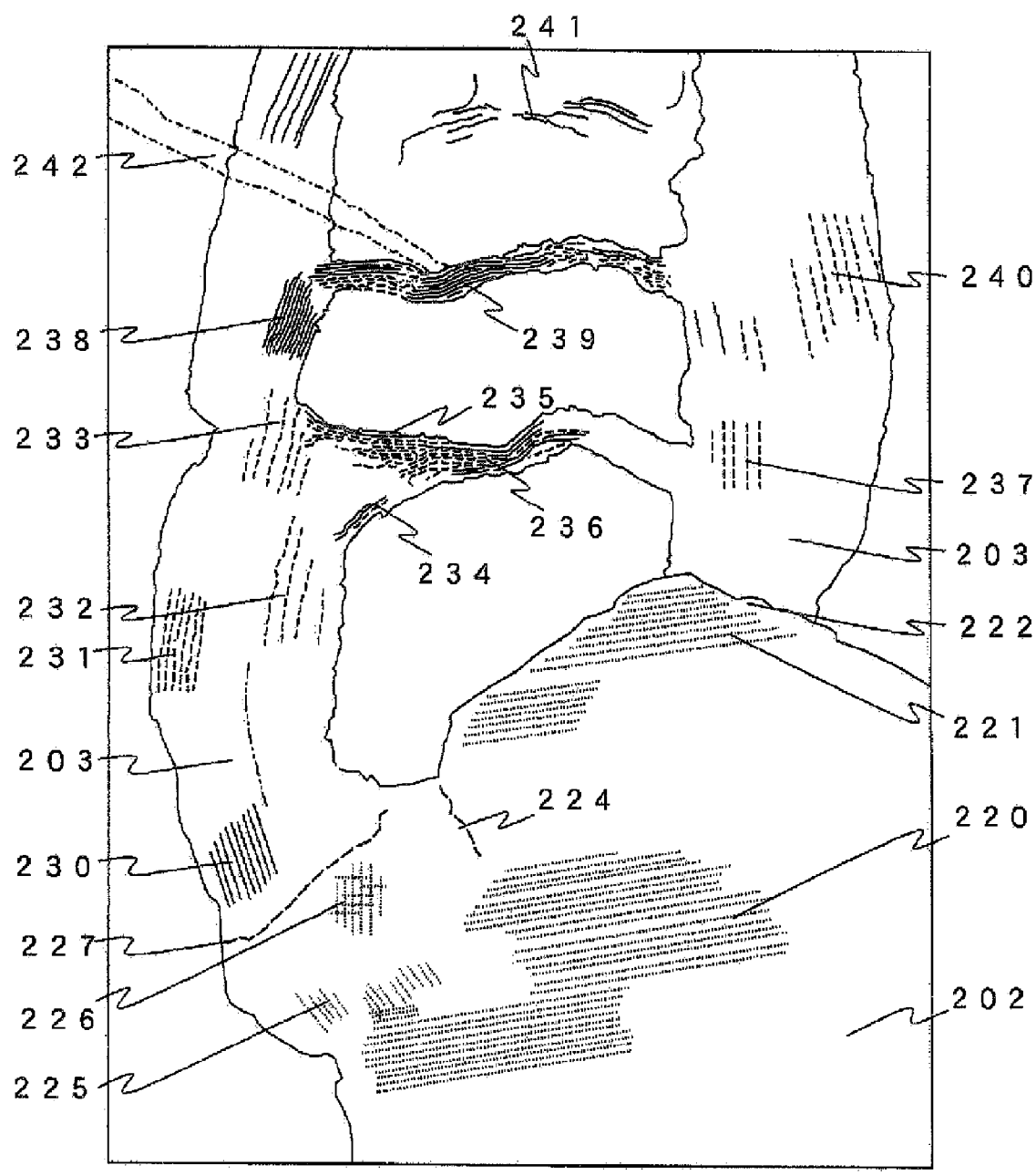
FIG. 14 is a schematic view for explaining the structure of the particle shown in FIG. 13.

FIG. 13 is an electron photomicrograph showing the structure of the particle of the present invention, which shows the junction of the Fe particle 202 and the tube 203 in FIG. 11 in an enlarged manner FIG. 14 is a schematic view or explaining the structure shown in the photograph of FIG. 13. For the simplification of explanation, FIG. 14 indicates only main portions of the crystal structure in FIG. 13 by solid lines and doted lines. Accordingly, blank portions around regions of dotted lines, if any, are only omitted portions.

In FIG. 14, an Fe particle 202 has surfaces along particular crystal planes in most regions, which are referred to as main Fe phases 220, 221 below. A phase 225 with differently orientated planes, a satin-surface phase 226, etc. were observed on the left side of the main Fe phase 220. Though the main Fe phase 220, etc. are depicted by parallel dotted lines, intervals of dots and lines are not necessarily identical with those shown in FIG. 13.

Referring to FIG. 14, the tube 203 extends from a hypothetical boundary 227 of the main Fe phase 221, and the inside of the tube wall is partitioned by nodes 236, 239. A region surrounded by the node 236, the Fe particle 202 and the tube wall, and a region surrounded by the nodes 236, 239 and the tube wall constituted cavities. The tube wall was mainly constituted by a graphite phase.

EXAMPLE 3

73 g of $\alpha$-$Fe_2O_3$ powder having an average particle size of 0.03 μm, 2.7 g of Ge powder having an average particle size of 20 μm, and 24.3 g of carbon black powder having an average particle size of 0.02 μm were mixed for 16 hours in a ball-milling mixer. In the above formulation, Fe/Ge was 95/5 by mass. A proper amount of the resultant mixed powder charged into an alumina boat was heat-treated at 1000° C. for 2 hours in a nitrogen gas. After cooled to room temperature, a heat-treated powder sample was recovered.

Figure 15:
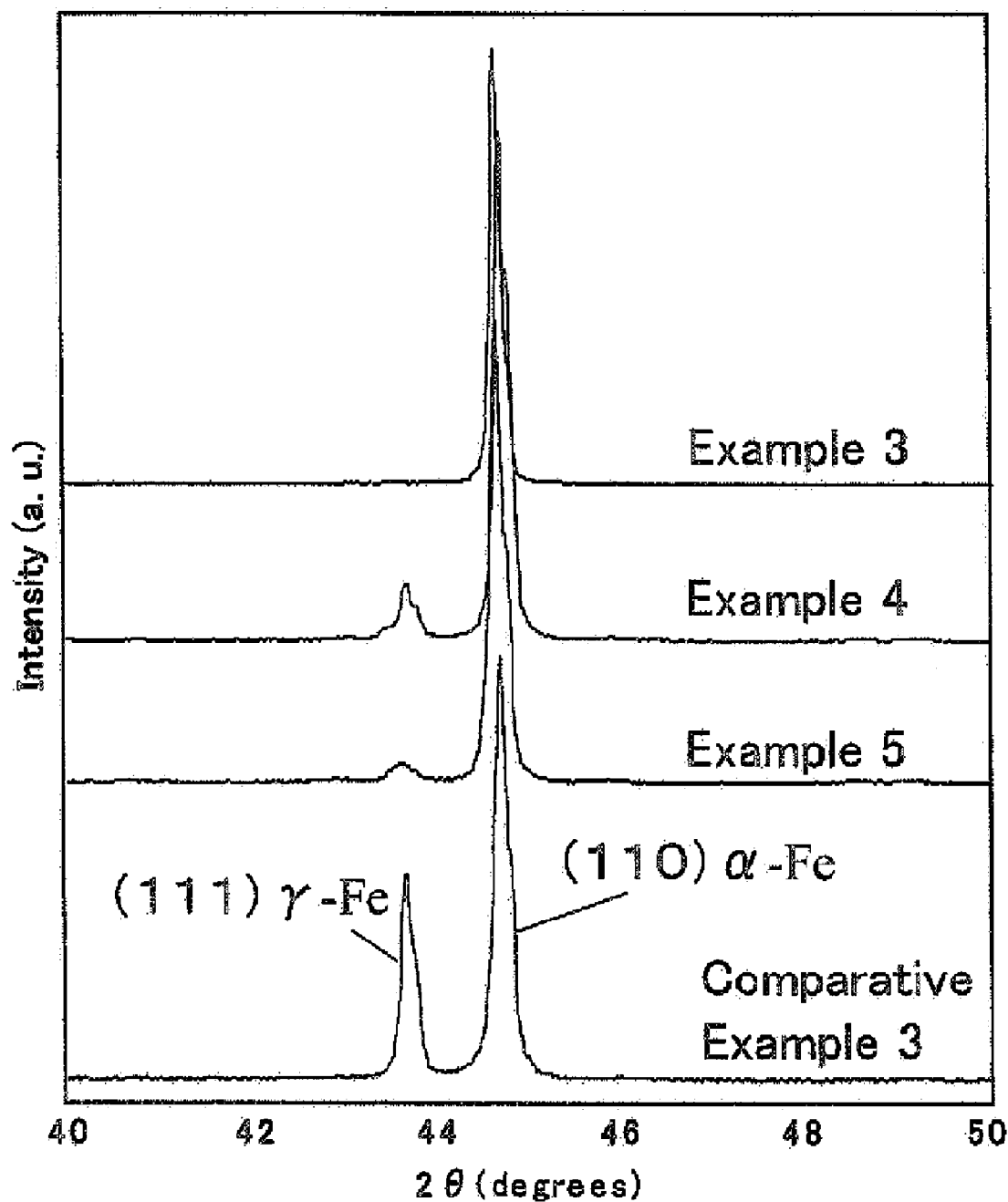
FIG. 15 is a graph showing the X-ray diffraction patterns of the powder samples.

The X-ray diffraction pattern of the above powder sample is shown in FIG. 15. Analysis by an analysis software "Jade, Ver. 5" available from Rigaku Corporation revealed that a face-centered cubic γ-Fe (111) and a body-centered cubic $\alpha$-Fe (110) were identified in the diffraction pattern shown in FIG. 15. In the graph of FIG. 15, the axis of abscissas indicates a diffraction angle 2θ (°), and the axis of ordinates indicates a diffraction intensity I [arbitrary unit (a.u.)]. The diffraction peak intensity ratio [I (111)/I(110)] is shown in Table 3. The average particle size of $\alpha$-Fe particles was 92 nm when determined from the half-width. The magnetic properties of the above powder sample were measured by VSM. The results are shown in Table 3. The peak intensity ratio was much smaller than in Comparative Example 3, suggesting that the sample had high saturation magnetization.

EXAMPLE 4

A powder sample was produced in the same manner as in Example 3 except for replacing Ge with Al. The X-ray diffraction pattern of the above powder sample is shown in FIG. 15. Analysis by an analysis software "Jade, Ver. 5" available from Rigaku Corporation identified a face-centered cubic γ-Fe (111) and a body-centered cubic α-Fe (110) in the diffraction pattern shown in FIG. 15. The average particle size of α-Fe particles determined from the diffraction peak intensity ratio and the half-width is shown in Table 3. The magnetic properties of the above powder sample measured by VSM are shown in Table 3. The peak intensity ratio was smaller than in Comparative Example 3, suggesting that the sample had high saturation magnetization.

EXAMPLE 5

73 g of α-$Fe_2O_3$ powder having an average particle size of 0.03 μm, 3.8 g of vanadium carbide (VC) powder having an average particle size of 20 μm, and 23.2 g of carbon black powder having an average particle size of 0.02 μm were mixed, and the heat-treated powder sample was recovered in the same manner as in Example 3. In the above formulation, Fe/N was 95/5 by mass. The X-ray diffraction pattern of the above powder sample is shown in FIG. 15. The diffraction peak intensity ratio and the average particle size of α-Fe particles are shown in Table 3. The magnetic properties of the above powder sample measured by VSM are shown in Table 3. The peak intensity ratio was smaller than in Comparative Example 3, suggesting that the sample had high saturation magnetization.

COMPARATIVE EXAMPLE 3

75 g of α-$Fe_2O_3$ powder having an average particle size of 0.03 μm, and 25 g of carbon black powder having an average particle size of 0.02 μm were mixed without adding an element X, and a heat-treated powder sample was recovered in the same manner as in Example 3. The X-ray diffraction pattern of the above powder sample is shown in FIG. 15. The intensity ratio [I (111)/I(110)], the average particle size and the magnetic properties measured in the same manner as in Example 1 are shown in Table 3. The (111) peak intensity ratio was larger than in Examples 3 to 5, suggesting that the sample had low saturation magnetization.

TABLE 3

| No. | Particle Size (nm) | Peak Intensity Ratio I(111)/I(110) | Saturation Magnetization ($Am^2$/kg) | Coercivity (kA/m) |
|---|---|---|---|---|
| Example 3 | 92 | 0 | 164 | 0.9 |
| Example 4 | 74 | 0.17 | 132 | 1.9 |
| Example 5 | 86 | 0.12 | 152 | 1.7 |
| Comparative Example 3 | 66 | 0.43 | 118 | 2.4 |

EXAMPLES 6 TO 9

α-$Fe_2O_3$ powder having an average particle size of 0.03 μm and $Co_3O_4$ powder having an average particle size of 0.6 μm at a ratio shown in Table 4, and carbon black powder having an average particle size of 0.02 μm in such an amount that it was 30% by mass were dry-mixed for 16 hours in a ball-milling mixer. The resultant mixed powder charged into an alumina boat was heat-treated at 1000° C. for 2 hours in a nitrogen gas atmosphere having a purity of 99.9% or more with an oxygen content in the atmosphere controlled to 10 ppm or less. The average particle size of each powder was determined by measuring the diameters of 60 fine particles arbitrarily selected in a TEM photograph, and averaging them.

Figure 16:
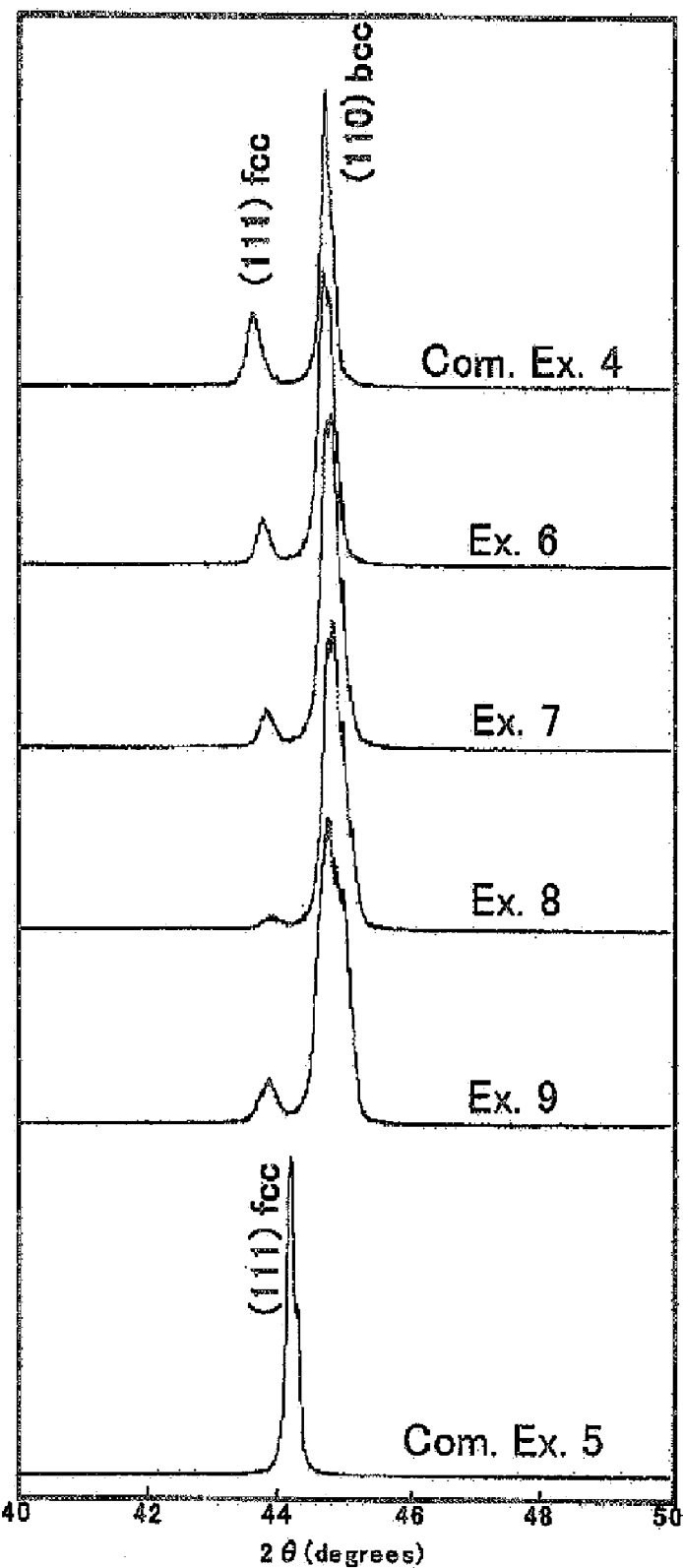
FIG. 16 is a graph showing the X-ray diffraction patterns of the Fe—Co particles.

The above powder sample was subjected to an X-ray diffraction measurement. Using RINT2500 available from Rigaku Corporation, the measurement was carried out with θ/2θ scanning in a 2θ range of 40° to 50° to determine the intensity of a (111) peak of a face-centered cubic (fcc) crystal and a (110) peak of a body-centered cubic (bcc) crystal. The X-ray diffraction pattern measured is shown in FIG. 16, in which the axis of abscissa indicates a diffraction angle 2θ (°), and the axis of ordinates indicates a relative intensity of the diffraction pattern. Because overlapping diffraction patterns are not discernible, the patterns are depicted with the scale of intensity displaced. The diffraction pattern was analyzed by "Jade, Ver. 5," an analysis software available from Rigaku Corporation. The diffraction peak intensity ratio [I (111)/I (110)] and the average particle size determined from the half-width of the (110) peak are shown in Table 5. The magnetic properties of the above powder sample measured by VSM-5 (available from Toei Industry Co., Ltd.) at a magnetic field in a range of ±2 T are shown in Table 5.

COMPARATIVE EXAMPLE 4

A powder sample was produced in the same manner as in Example 6 to 9 except for using 70% by mass of α-$Fe_2O_3$ powder having an average particle size of 0.03 μm, and 30% by mass of carbon black powder having an average particle size of 0.02 μm. The X-ray diffraction pattern of the sample is shown in FIG. 16, and the properties of the sample are shown in Table 5.

COMPARATIVE EXAMPLE 5

A powder sample was produced by the same materials (see Table 4) and production method as in Examples 6 to 9, except for using 70% by mass of $Co_3O_4$ powder having an average particle size of 0.6 μm, and 30% by mass of carbon black powder having an average particle size of 0.02 μm. The X-ray diffraction pattern of the sample is shown in FIG. 16, and the properties of the sample are shown in Table 5. The average particle size of nano-sized particles constituting the sample was determined from the (111) peak.

TABLE 4

| | Formulation (% by mass) | | |
|---|---|---|---|
| No. | $Fe_2O_3$ | $Co_3O_4$ | C |
| Example 6 | 55 | 15 | 30 |
| Example 7 | 50 | 20 | 30 |
| Example 8 | 45 | 25 | 30 |
| Example 9 | 40 | 30 | 30 |
| Comparative Example 4 | 70 | 0 | 30 |
| Comparative Example 5 | 0 | 70 | 30 |

TABLE 5

| | After Heat Treatment | | | | |
|---|---|---|---|---|---|
| No. | Co/Fe (by mass) | I(111)/ I(110) | Average Particle size (nm) | Saturation Magnetization (Am²/kg) | Coercivity (kA/m) |
| Example 6 | 0.30 | 0.17 | 38 | 134 | 9.8 |
| Example 7 | 0.44 | 0.12 | 31 | 139 | 11 |
| Example 8 | 0.61 | 0.03 | 27 | 150 | 12 |
| Example 9 | 0.82 | 0.09 | 23 | 141 | 12 |
| Comparative Example 4 | 0 | 0.31 | 49 | 82.4 | 6.1 |
| Comparative Example 5 | ∞ | — | 98 | 111 | 3.6 |

It is clear from Table 5 that the ratio of I(111)/I(110) in the samples of Examples 6 to 9 is as small as less than 0.2, much smaller than in Comparative Examples 4 and 5, suggesting that the addition of Co suppresses the precipitation of a γ phase. The samples of Examples 6 to 9 had as high saturation magnetization as more than 120 Am²/kg, suggesting that the addition of Co increased the volume ratio of an α phase having ferromagnetism, resulting in improved saturation magnetization. Nano-sized particles constituting the powder samples of Examples 6 to 9 had smaller average particle sizes than those of Comparative Examples 4 and 5, indicating that fine particles having a body-centered cubic crystal structure (α phase) were obtained.

EXAMPLE 10

α-$Fe_2O_3$ powder having an average particle size of 0.6 μm and boron powder having an average particle size of 30 μm were mixed in equal amounts, and heat-treated at 1100° C. for 2 hours in a nitrogen gas stream. Unnecessary non-magnetic components were removed from the product to obtain fine iron particles having an average particle size of 2 μm each coated with boron nitride. 5 g of this fine particles were dispersed in 100 ml of ethanol, to which tetraethoxysilane was added. While stirring this dispersion, a mixed solution of 22 g of pure water and 4 g of ammonia water was added. Thereafter, the resultant dispersion was stirred by a ball mill, while properly adjusting the concentration of the tetraethoxysilane and the stirring time by a ball mill. It was then dried at 100° C. or higher in the air, and further heat-treated at 400° C. in a nitrogen atmosphere.

The resultant fine iron particles was observed by TEM and analyzed by EDX, confirming that each fine iron particle had a multilayer coating comprising a boron nitride layer in contact with the particle and then a silicon oxide layer outside the boron nitride layer. The boron nitride layer was as thick as 4 nm. The thickness of the silicon oxide layer was changed from 5 nm to 80 nm, by changing the ball-milling stirring time from 10 minutes to 3 hours. Also, when the amount of tetraethoxysilane added was changed from 0.5 g to 2 g with a ball-milling stirring time fixed to 3 hours, the thickness of the resultant multilayer coating changed from 5 to 80 nm. Lattice fringes assigned to a hexagonal crystal structure were observed in the boron nitride layer. On the other hand, no lattice fringes were observed in the silicon oxide layer, suggesting that the silicon oxide layer had an amorphous structure. The measurement of infrared absorption spectra revealed absorption peaks of silicon oxide in a range of a wave number of 1250 to 1020 cm$^{-1}$, confirming the formation of the silicon oxide layen.

Figure 17:
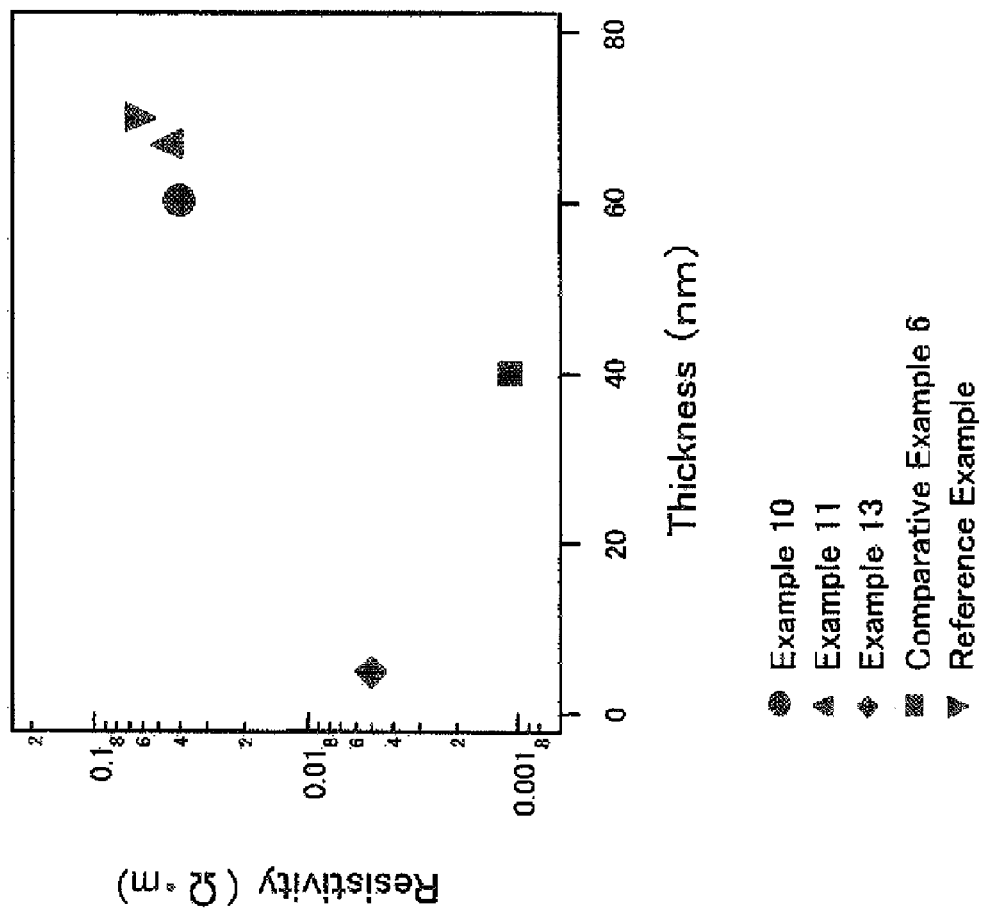
FIG. 17 is a graph showing the relation between the thickness of a silicon oxide layer and electric resistance in the fine composite metal particles.

To examine the effect of the silicon oxide layer to increase electric resistance, fine particles having a 60-nm-thick silicon oxide layer among those having a multilayer inorganic coating obtained by the above method were pressed at 20 MPa or more to form a flat plate. A mold was coated with a silver paste for an electrode at both ends to measure electric resistivity between the two electrode terminals. The relation between the thickness (nm) and resistivity (Ω·m) of the silicon oxide layer measured above is shown in FIG. 17.

To examine the corrosion resistance of the above fine iron particles having a composite coating of boron nitride and silicon oxide, their magnetic properties were compared before and after the corrosion resistance test, which was conducted at a temperature of 120° C. and a humidity of 100% for 12 hours by a pressure cooker test machine. The magnetic properties were measured by VSM. Saturation magnetization obtained by the VSM measurement before and after the corrosion resistance test, and a demagnetization ratio obtained therefrom are shown in Table 6. The saturation magnetization of the resultant fine composite iron particles before and after the corrosion resistance test was 64% and 61%, respectively, of that of iron.

TABLE 6

| | Saturation Magnetization (A·m²/kg) | | Demagnetization |
|---|---|---|---|
| No. | Before[1] | After[2] | Ratio (%) |
| Example 10 | 140 | 134 | 4.3 |
| Example 11 | 148 | 140 | 5.4 |
| Example 12 | 152 | 143 | 5.9 |
| Example 13 | 155 | 142 | 8.4 |
| Example 15 | 160 | 152 | 6.9 |
| Comparative Example 6 | 206 | 165 | 20.0 |

Note:
[1]Before the corrosion resistance test.
[2]After the corrosion resistance test.

EXAMPLE 11

Iron oxide powder having an average particle size of 30 nm and carbon powder having an average particle size of 20 μm were mixed in equal amounts, and heat-treated at 1000° C. for 2 hours in a nitrogen gas atmosphere, to obtain fine, carbon-coated iron particles having an average particle size of 1 μm. The particles were then coated with silicon oxide in the same manner as in Example 10.

The resultant fine particles were observed by TEM and analyzed by EDX to confirm that each fine iron particle had a multilayer coating comprising an inner carbon layer in contact with the iron particle and an outer silicon oxide layer. The carbon layer was as thick as 10 nm on average, and the thickness of the silicon oxide layer was ranging from 8 nm to 90 nm. Lattice fringes assigned to a hexagonal crystal structure were observed in the carbon layer, confirming that the carbon layer was based on a graphite phase. On the other hand, lattice fringes were not observed in the silicon oxide layer, indicating that the silicon oxide layer had an amorphous structure. The saturation magnetization of the fine composite iron particles was 68% of that of iron. The electric resistivity of the fine magnetic particles was measured in the same manner as in Example 10. The relation between the thickness and electric resistivity of the silicon oxide layer measured is shown in FIG. 17. Corrosion resistance was also evaluated in the same manner as in Example 10. The results are shown in Table 6.

Figure 18:
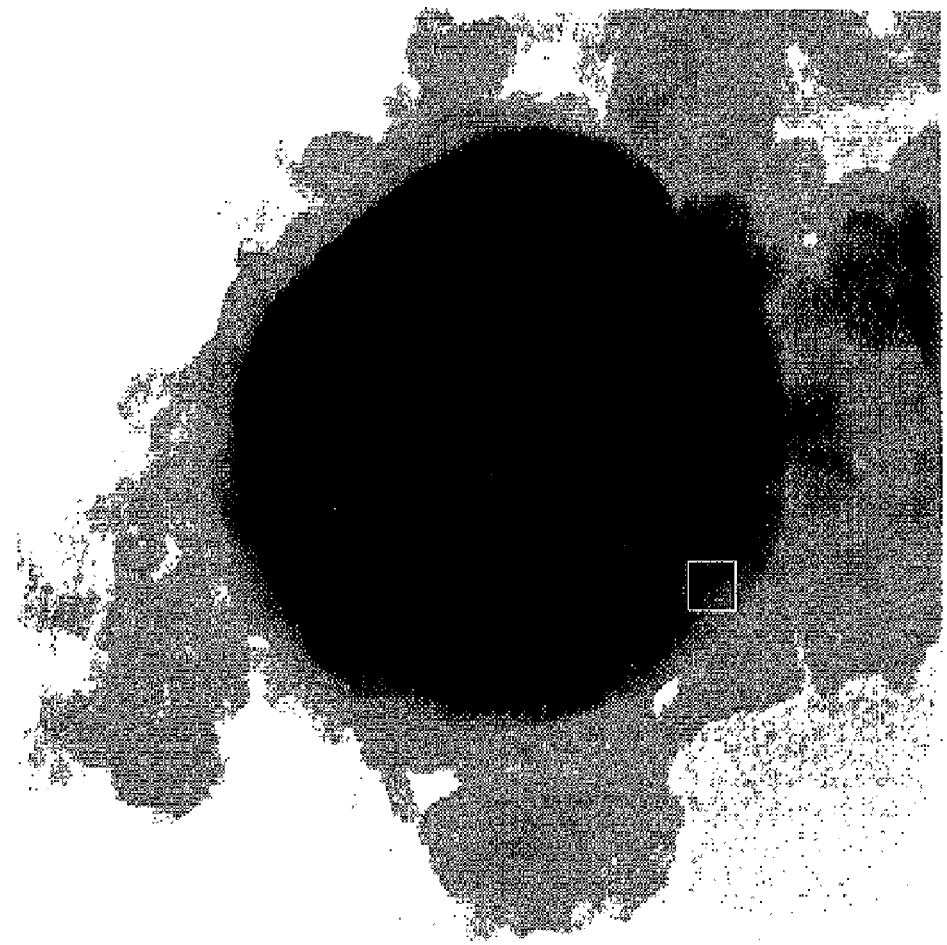
FIG. 18 is a TEM photograph showing the multilayer-coated fine composite metal particle.
Figure 19:
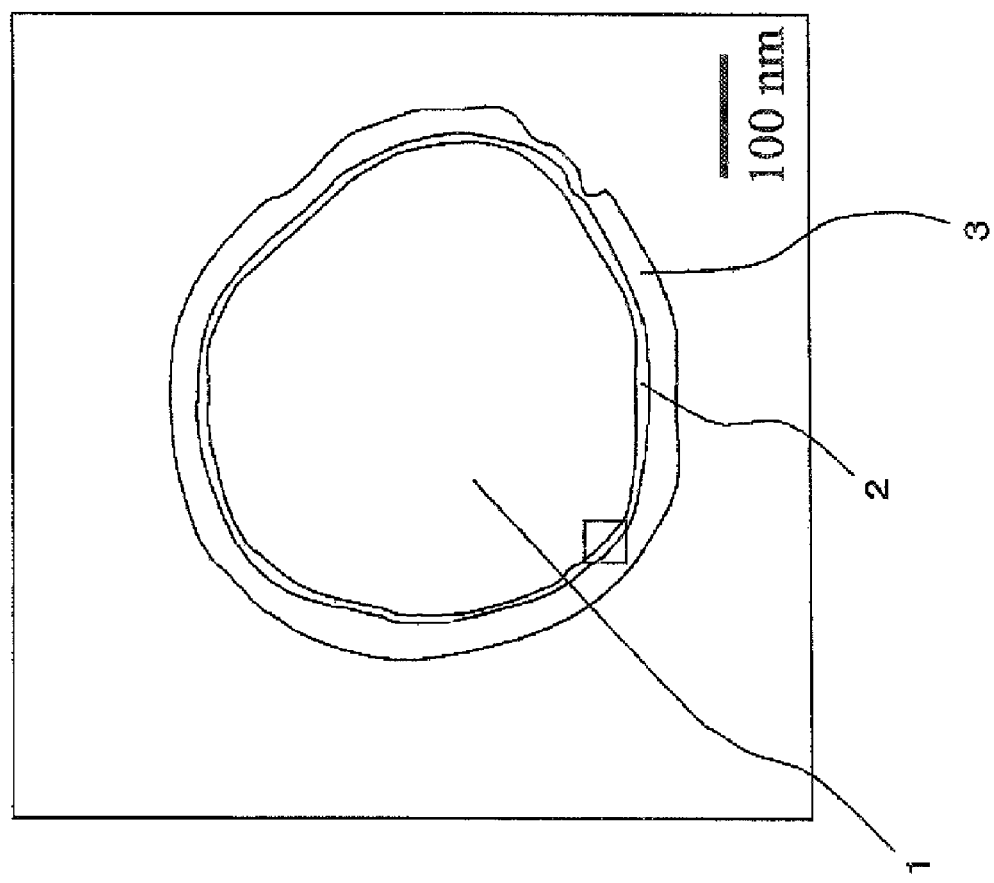
FIG. 19 is a schematic view for explaining the structure of the multilayer-coated fine composite metal particle shown in FIG. 18.

One fine iron particle having a particularly small diameter particle size among those obtained in Example 11 was observed by TEM as shown in FIG. 18. FIG. 19 is a schematic view depicting an important portion of the photograph of FIG. 18. The fine particle had a multilayer coating comprising an inner carbon layer 2 in contact with an iron core 1, and an outer silicon oxide layer 3. This carbon layer 2 was as thick as about 5 nm, and the silicon oxide layer 2 had a thickness ranging from 10 nm to 40 nm. Lattice fringes assigned to a hexagonal crystal structure were observed in the carbon layer, confirming that the carbon layer was based on a graphite phase. On the other hand, lattice fringes were not observed in the silicon oxide layer, indicating that it had an amorphous structure. Surrounding smaller-diameter particles were a silicon byproduct formed separately from the fine iron particles.

Figure 20:
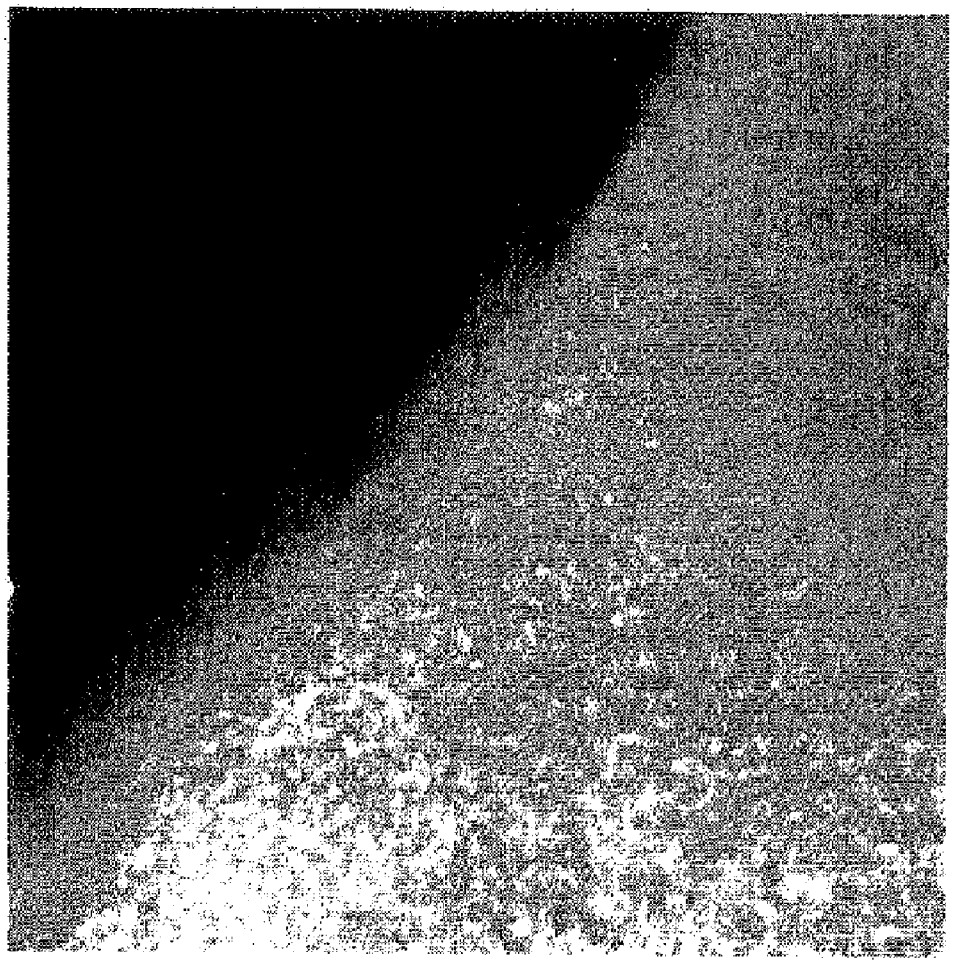
FIG. 20 is a TEM photograph showing part of the multilayer-coated fine composite metal particle of FIG. 18 in an enlarged manner.
Figure 21:
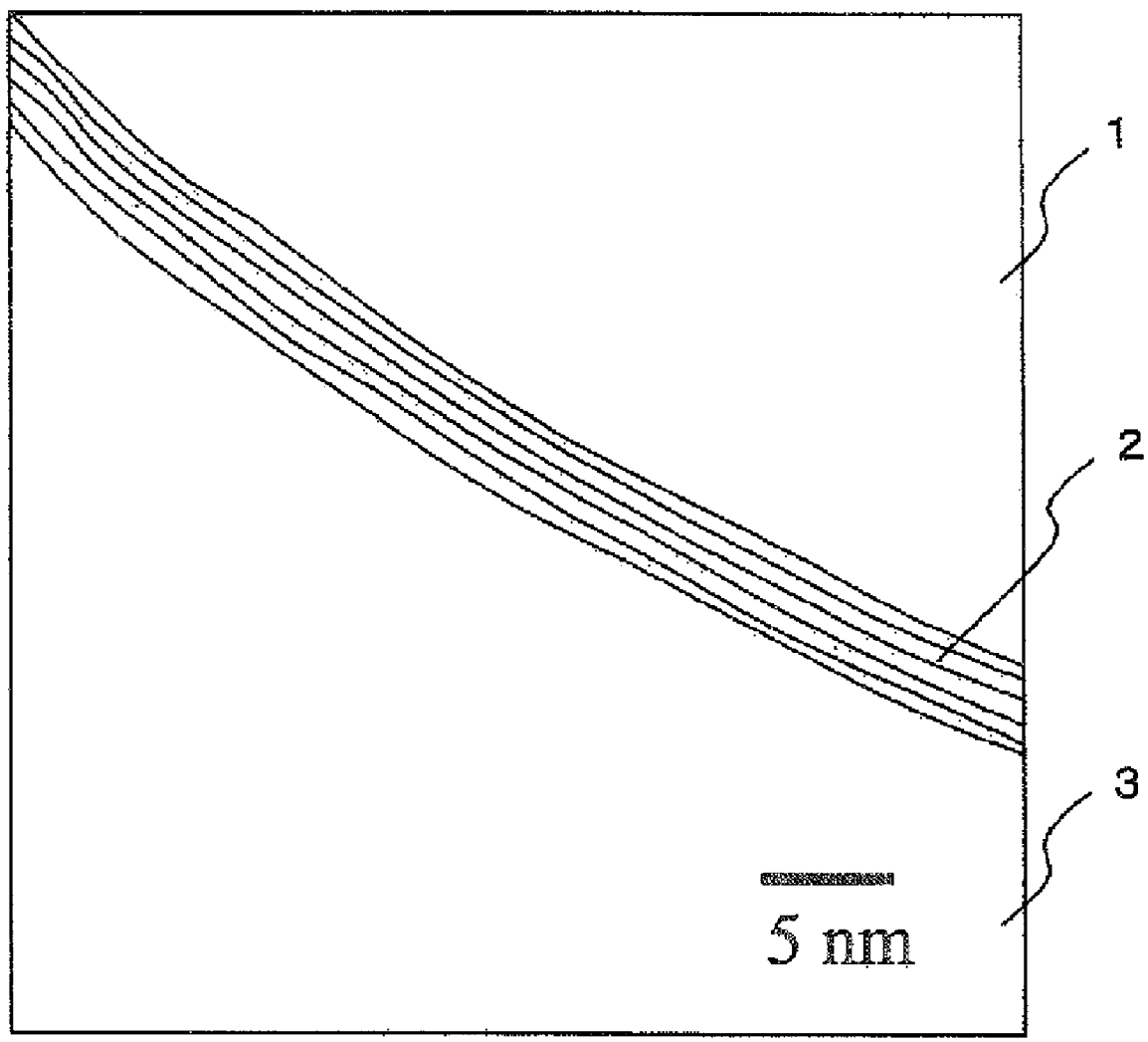
FIG. 21 is a schematic view for explaining the structure of the multilayer-coated fine composite metal particle shown in FIG. 20.

FIG. 20 is a TEM photograph showing part of the particle in FIG. 18 in an enlarged manner, and FIG. 21 is a schematic view showing an important portion of the photograph of FIG. 20. It is clear from FIG. 20 that the Fe core 1 was coated with a uniform-thickness carbon layer 2.

EXAMPLE 12

Fine, composite, magnetic particles each comprising a magnetic iron-cobalt alloy core and a multilayer coating comprising a carbon layer and 10-nm-thick silicon oxide layer were produced in the same manner as in Example 11, except that iron oxide particles and cobalt oxide particles having the same average particle size, and carbon powder in an equal amount were mixed in the production of carbon-coated, fine magnetic particles. The corrosion resistance of the fine, composite, magnetic particles was evaluated in the same manner as in Example 10. The results are shown in Table 6. The saturation magnetization of the resultant fine composite particles before and after the corrosion resistance test was 70% and 66%, respectively, of that of iron.

EXAMPLE 13

Fine magnetic particles were produced in the same manner as in Example 11 except for using aluminum powder having an average particle size of 2 μm in place of carbon powder. Electron microscopic observation and EDX analysis confirmed that each resultant fine magnetic particle had a 3-nm-thick coating layer of aluminum oxide. The fine magnetic particles were then coated with a 5-nm-thick silicon oxide layer in the same manner as in Examples. The saturation magnetization of the resultant fine composite iron particles was 71% of that of iron. The electric resistivity and corrosion resistance of the fine magnetic particles measured in the same manner as in Example 10 are shown in FIG. 17 and Table 6.

EXAMPLE 14

Fine magnetic particles were produced in the same manner as in Example 11 except for using titanium powder having an average particle size of 2 μm in place of carbon powder. Electron microscopic observation and EDX analysis confirmed that the resultant fine magnetic particles had a 5-nm-thick coating layer composed of a titanium compound. The resultant fine magnetic composite particles were then coated with a 50-nm-thick silicon oxide layer in the same manner as in Example 11. The saturation magnetization of the resultant fine composite iron particles was 65% of that of iron.

EXAMPLE 15

Figure 22:
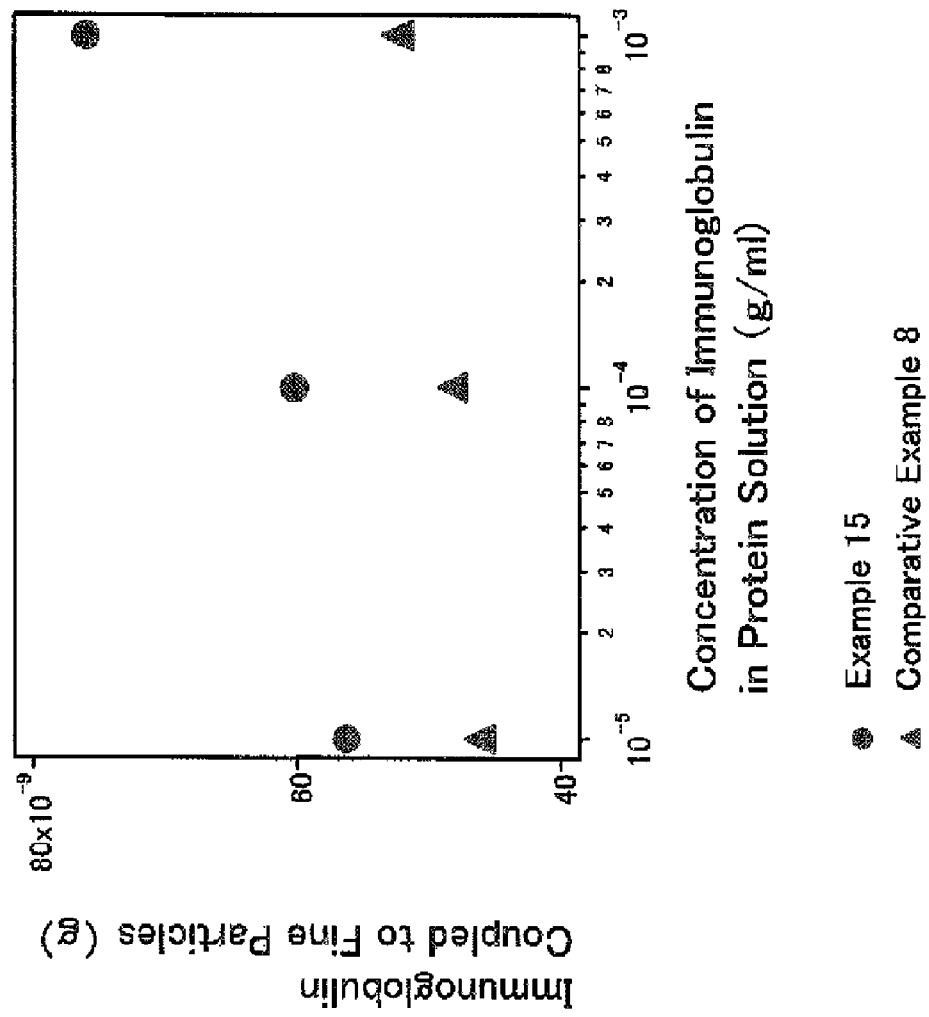
FIG. 22 is a graph showing the relation between the concentration of immunoglobulin in a protein suspension and the amount of immunoglobulin attached to the fine composite metal particles.

Fine iron particles coated with a boron nitride layer and an outermost 10-nm-thick silicon oxide layer were produced in the same manner as in Example 10. The saturation magnetization of the resultant fine composite iron particles was 73% of that of iron. The fine composite iron particles were dispersed in substantially neutral water, and mixed with colloidal gold having an average size of 4 nm having a surface potential adjusted such that its electric double layer potential (ζ potential) on the surface was positive. Because the surface potential of the fine iron particles was negative in neutral water, each fine composite iron particle was coated with colloidal gold particles by sufficient stirring. The fine composite iron particles were filtered out, dried, and then heat-treated at 700° C. in a nitrogen gas atmosphere to produce multilayer-coated fine composite iron particles having a uniform coating layer of fine gold particles. The corrosion resistance was evaluated in the same manner as in Examnple 10. The results are shown in Table 6. The multiayer-coated iron particles were suspended in a solution of a fluorescein-labeled rabbit protein (immunoglobulin). After washing, the fluorescent intensity by fluorescein was measured to calculate the amount (g) of immunoglobulin coupled to the multilayer-coated iron particles. The relation between the concentration (g/mol) of immunoglobulin in the protein solution used and the amount of immunoglobulin coupled to the multilayer-coated iron particles is shown in FIG. 22.

EXAMPLE 16

Figure 23:
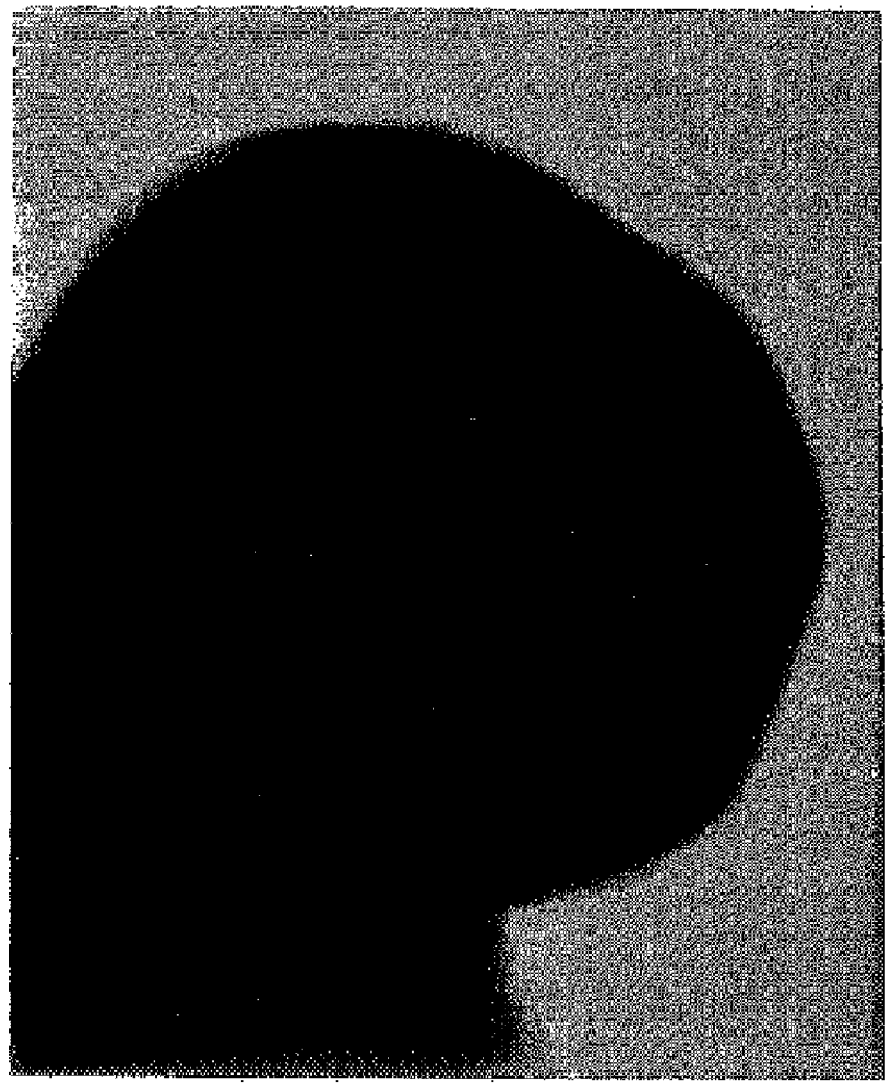
FIG. 23 is a TEM photograph showing the multilayer-coated fine composite metal particle.
Figure 24:
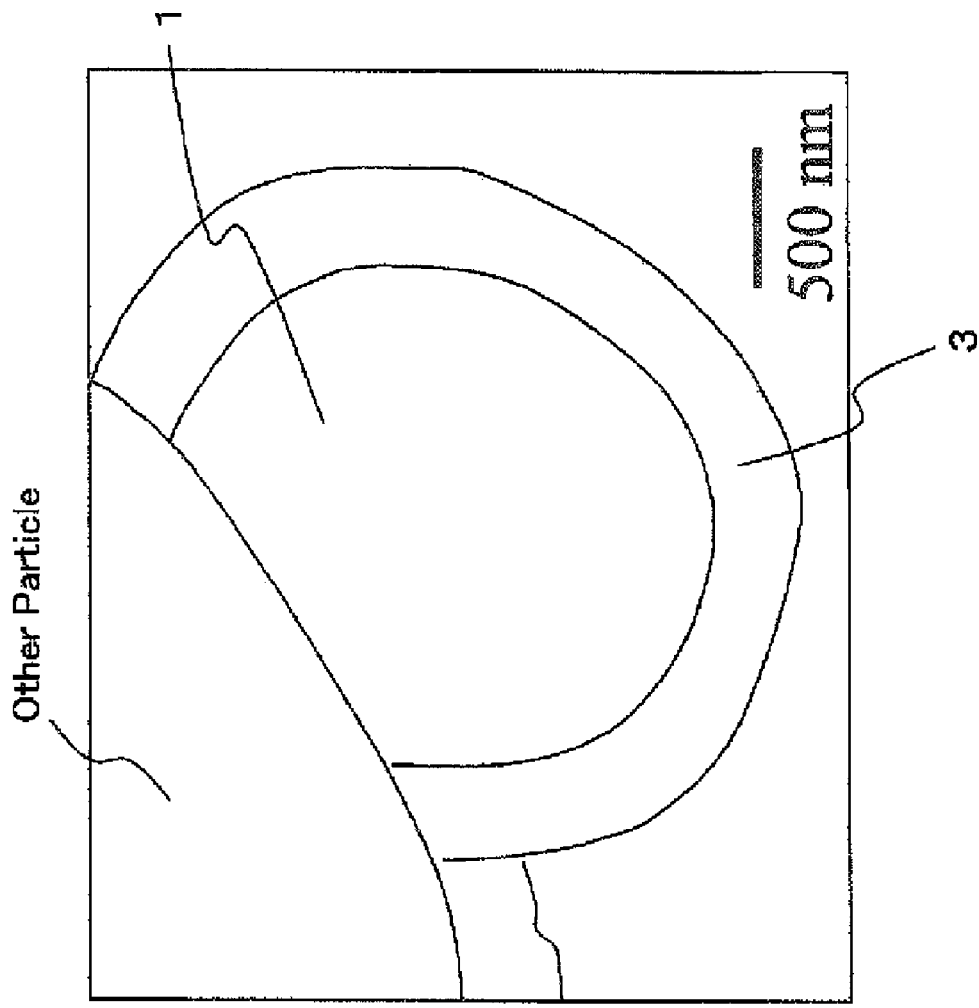
FIG. 24 is a schematic view for explaining the structure of the fine composite metal particle shown in FIG. 23.

A sample was produced in the same manner as in Example 11, except that 0.03 g of KCl was added as an electrolyte in the coating treatment of particles with silicon oxide. FIG. 23 is a TEM photograph of the resultant fine composite iron particles. FIG. 24 is a schematic view showing an important portion of the photograph of FIG. 23. The resultant multilayer-coated fine composite iron particles had an inner carbon layer in contact with the Fe core 1, and an outer silicon oxide layer 3. The TEM observation of the fine particles revealed that the silicon oxide layer was as thick as 360 nm. The saturation magnetization of the fine composite iron particles was 66% of that of iron.

EXAMPLE 17

Figure 25:
FIG. 25 is a photograph of the fine composite metal particles of the present invention in a fluorescent-labeling method, which was taken by a fluorescent inverted microscope.
Figure 26:
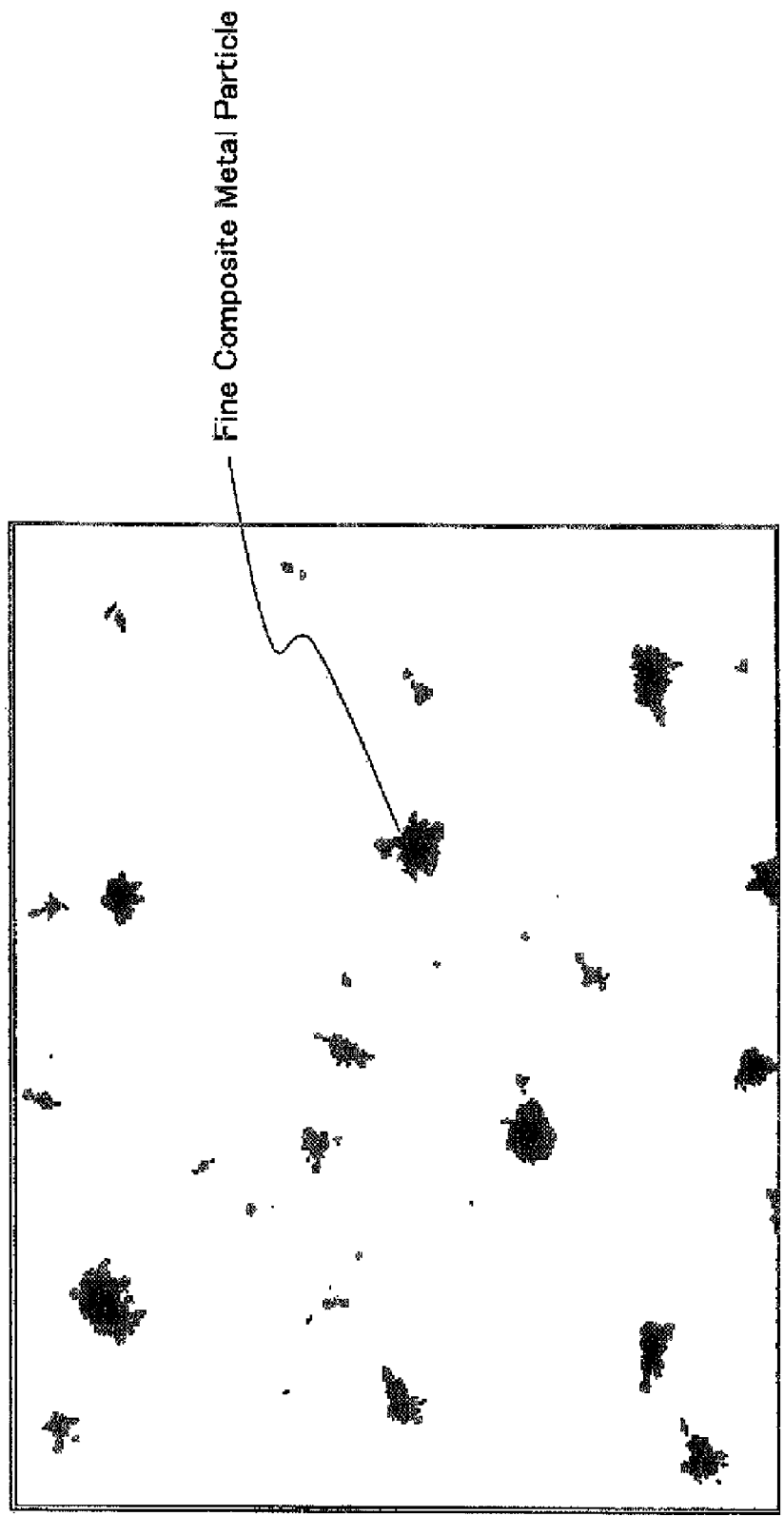
FIG. 26 is a schematic view corresponding to the photograph of FIG. 25.

Fine iron particles each having a composite coating layer comprising an inner carbon layer and an outermost 100-nm-thick silicon oxide layer were produced in the same manner as in Example 11. The attachment of amino groups to the surfaces of the resultant fine particles was confirmed by a fluorescent-labeling method using a fluorescent substance (Rohodamine-x NHS) specifically coupling to amino groups. The fine composite iron particles were dispersed and stirred in a 0.5-% aqueous solution of 3-(2-aminoethylaminopropyl)trimethoxysilane for 3 hours so that amino groups were carried by the surfaces of the fine composite iron particles. The fine particles were then added to a solution of Rohodamine-x NHS in N,N-dimethylformamide and stirred. FIG. 25 is a photograph of the fine particle taken by a fluorescent inverted microscope, and FIG. 26 is a schematic view for explaining the photograph of FIG. 25. FIG. 26 shows fluorescence-emitting particles. This indicates that —$NH_2$ groups (Rohodamine-x NHS) were carried by the surfaces of the fine composite metal particles.

EXAMPLE 18

Figure 27:
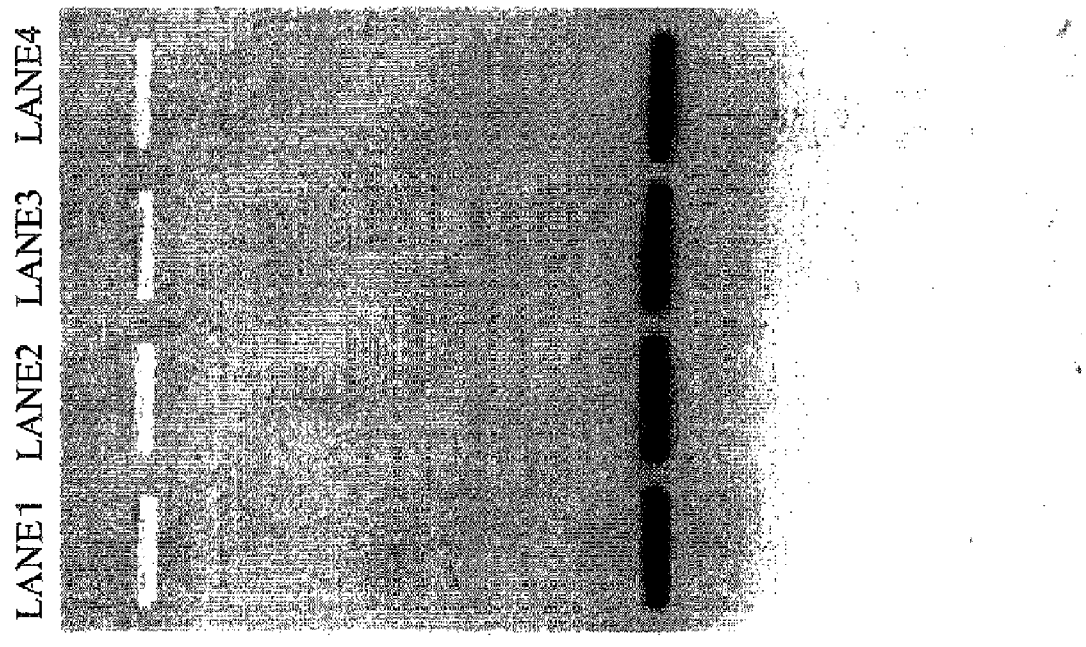
FIG. 27 is a photograph showing the results of an electrophoresis experiment with a DNA-extracting liquid, using the fine composite metal particles of the present invention.
Figure 28:
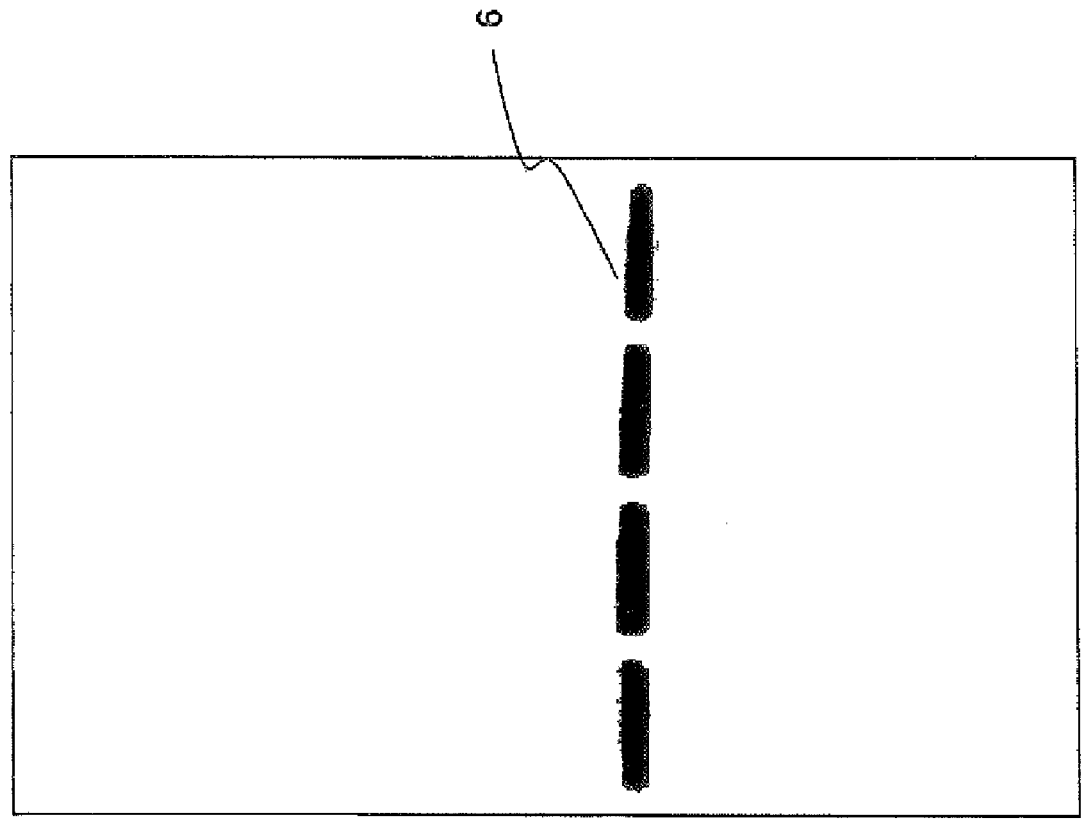
FIG. 28 is a schematic view corresponding to the photograph of FIG. 27.

Fine composite iron particles having a multilayer coating comprising an inner carbon layer and an outermost 100-nm-thick silicon oxide layer were produced in the same manner as in Example 11. To evaluate a DNA-extracting performance, a DNA extraction kit, "Mag Extractor-Genome-®" available from Toyobo Co., Ltd., was used to carry out DNA extraction by the following procedures. First, 25 mg of multilayer-coated fine composite particles were dispersed in 100 μL of a Tris-EDTA solution (pH 8.0), and 1 μg of DNA (630 bp) was added to the resultant fine particles dispersion. DNA was coupled to the multilayer-coated fine composite particles in a dissolving/absorbing liquid attached to the DNA extraction kit, and washed with a cleansing liquid attached to the extraction kit and a 70-% aqueous ethanol solution. It was then stirred in sterilized water to obtain a DNA-extracted aqueous solution. In these steps, a magnetic stand available from Promega was used to separate out the multilayer-coated fine composite particles. The amount of extracted DNA was measured by an electrophoresis method. The results are shown by lanes 1 and 2 in FIG. 27. FIG. 28 is a schematic view for explaining the photograph of FIG. 27. FIG. 28 shows a band 6 corresponding to extracted nucleic acid. This result indicates that the multilayer-coated fine composite particles of present invention having an outermost silicon oxide layer can extract DNA. 0.70 μg of DNA was extracted among 1 μg of DNA introduced, indicating that magnetic beads comprising the multilayer-coated fine composite particles of the present invention have an excellent function of extracting nucleic acid.

EXAMPLE 19

Fine iron particles coated with carbon and silicon oxide and having amino groups carried on the outermost layer were produced in the same manner as in Example 17. DNA extraction and electrophoresis were carried out using these fine particles in the same manner as in Example 18. The results are shown by lanes 3 and 4 in FIG. 27. The electrophoresis experimental results indicate that DNA was extracted. 0.77 μg of DNA was extracted among 1 μg of DNA introduced, 10% higher than in Example 18, indicating that the DNA-extracting performance is improved by having the fine composite particles having a carbon layer and an outermost silicon oxide layer carry amino groups.

COMPARATIVE EXAMPLE 6

A silicon oxide coating layer was formed on the fine iron particles using carbonyl iron particles having an average particle size of 3 μm to evaluate electric resistivity and corrosion resistance in the same manner as in Example 10. The results are shown in FIG. 17 and Table 6. Though the silicon oxide-coated, fine carbonyl iron particles obtained in Comparative Example 6 exhibited high saturation magnetization, they had a demagnetization ratio of 20% in the corrosion resistance test, extremely higher than those of the multilayer-coated, magnetic, fine composite metal particles of Examples 10 to 13 and 15. This indicates that the multilayer coating of the fine composite metal particles with carbon and/or boron nitride and silicon oxide extremely improves their corrosion resistance. The fine particles obtained in Comparative Example 6 had lower resistivity than those of the multilayer-coated, magnetic, fine composite metal particles of Examples 10 to 13 and 15. This appears to be due to the fact that the multilayer coating of carbon and/or boron nitride and silicon oxide on the fine composite metal particles provides high resistivity.

COMPARATIVE EXAMPLE 7

A sample was produced in the same manner as in Example 11 except for using 5 g of tetraethoxysilane, 22 g of ammonia water and 4 g of water. The silicon oxide layer had a thickness of 600 nm, and a saturation magnetization of 100 $Am^2/kg$, 46% of that of iron. This indicates that when the silicon oxide layer is as thick as 600 nm, the saturation magnetization decreases. This sample had large amounts of excessive silica spheres that did not form the coating layer.

COMPARATIVE EXAMPLE 8

Magnetite ($Fe_3O_4$) particles having an average particle size of 30 nm used as fine magnetic particles were coated with gold in the same manner as in Example 15, to measure the amount of coupled immunoglobulin of a fluorescein-labeled rabbit. The results are shown in FIG. 4.

REFERENCE EXAMPLE 1

A sample was produced to measure electric resistance in the same manner as in Example 11, except for using 6.4 mol/kg (6.7 g) of tetraethoxysilane, 25.7 mol/kg (4.5 g) of ammonia water, and 79.3 mol/kg (7.1 g) of water per a unit amount of metal particles. The results are shown in FIG. 17. Though the silicon oxide layer had a thickness of 70 nm and high resistivity, large amounts of silicon oxide particles were formed immediately after the production of the sample.

It is clear from FIG. 17 that the fine particles of the present invention having a multilayer coating comprising a first layer of boron nitride, carbon or aluminum oxide, etc. in contact with the magnetic metal core and a second layer of silicon oxide exposed outside have higher resistance than conventional ones. It is also clear that in the formation of the silicon oxide layer, the thickness and thus electric resistance of the oxide layer can be controlled by properly adjusting the amount of tetraethoxysilane added. Further, as is clear from Table 6, the fine particles of the present invention having multilayer coatings of carbon, boron nitride or aluminum oxide, and silicon oxide have sufficient stability in oxidation resistance, etc.

In the present invention, the outermost surface layer may be formed by a material such as gold, etc. suitable for attaching to biosubstances. As shown in FIG. 22, because the particle cores are composed of magnetic metals having high magnetic flux densities, the fine particles of the present invention are highly suitable for the separation and purification of biosubstances.

As described above, the fine composite metal particles of the present invention are insulating and bioactive, as well as having high saturation magnetization. For instance, the fine composite metal particles of the present invention each comprising a magnetic metal core having an average particle size of 10 μm or less, and a multilayer coating comprising 2 or more layers of different inorganic materials have high insulation with reduced deterioration of saturation magnetization. The fine composite metal particles of the present invention can be produced at high productivity.

The fine composite metal particles of the present invention can be used for magnetic recording media such as magnetic tapes, magnetic recording disks, etc., magnetic shields, electronic devices such as parts for absorbing unnecessary electromagnetic waves, filters for absorbing particular bandwidths, inductors, yokes, etc., magnetic beads for extracting and separating DNA, protein components, cells, etc.

What is claimed is:

1. A method for producing fine composite metal particles comprising the steps of mixing oxide powder of a magnetic metal with powder containing at least one element selected from the group consisting of Si, V, Ti, Al, Nb, Zr and Cr to provide a mixed powder, heat-treating said mixed powder in a non-oxidizing atmosphere of Ar, He, $N_2$ or their combination at a temperature of 600° C. to 1400° C. to produce fine metal particles coated with an oxide layer based on at least one of said elements, wherein said oxide powder of the magnetic metal is reduced by said powder containing said element to form said fine metal particles and said oxide layer simultaneously.

2. The method for producing fine composite metal particles according to claim 1, which comprises further coating the resultant coated fine metal particles with a layer of an inorganic material.

3. The method for producing fine composite metal particles according to claim 2, wherein the layer of said inorganic material is substantially composed of silicon oxide formed by hydrolyzing silicon alkoxide.

4. The method for producing fine composite metal particles according to claim 3, wherein said layer of silicon oxide is formed from silicon alkoxide, water, a catalyst and an electrolyte in an alcohol solvent.

5. The method for producing fine composite metal particles according to claim 4, wherein after forming said silicon oxide layer, said fine composite metal particles are further coated with an amino-group-containing silane coupling agent to introduce an —$NH_2$ group.

6. The method for producing fine composite metal particles according to claim 1, wherein said powder containing at least one element selected from the group consisting of Si, V, Ti, Al, Nb, Zr and Cr is present in more than a stoichiometric amount to reduce said oxide powder of the magnetic metal.

* * * * *